United States Patent [19]
Lindsay

[11] Patent Number: 5,992,121
[45] Date of Patent: Nov. 30, 1999

[54] MODULAR SUPPORT ASSEMBLY

[76] Inventor: Fredrick H. Lindsay, 9393 - 120th La. North, Seminole, Fla. 34642

[21] Appl. No.: 08/937,254

[22] Filed: Sep. 13, 1997

Related U.S. Application Data

[60] Provisional application No. 60/050,204, Jun. 19, 1997.

[51] Int. Cl.⁶ .................................................. F04B 1/10
[52] U.S. Cl. .............................. 52/690; 52/691; 52/143; 280/789; 280/799
[58] Field of Search ........................... 52/143, 691, 690; 280/789, 799

[56] References Cited

U.S. PATENT DOCUMENTS

| | | | |
|---|---|---|---|
| 702,332 | 6/1902 | Samen | 280/789 |
| 2,420,803 | 5/1947 | Tobin | 189/21 |
| 2,743,940 | 5/1956 | Bohlen | 280/789 |
| 3,221,461 | 12/1965 | Grunfeld | 52/376 |
| 3,612,569 | 10/1971 | Marinelli | 280/106 |
| 3,716,267 | 2/1973 | Lindsay | 52/143 |
| 3,751,870 | 8/1973 | Vesel . | |
| 4,015,375 | 4/1977 | Lindsay | 52/143 |
| 4,019,299 | 4/1977 | Lindsay . | |
| 4,106,258 | 8/1978 | Lindsay | 52/693 |
| 4,131,301 | 12/1978 | Werner | 280/789 |
| 4,275,537 | 6/1981 | Pinson | 52/223 |
| 4,863,189 | 9/1989 | Lindsay | 280/789 |
| 4,930,809 | 6/1990 | Lindsay . | |
| 5,028,072 | 7/1991 | Lindsay | 52/143 |
| 5,201,546 | 4/1993 | Lindsay | 280/789 |
| 5,226,583 | 7/1993 | Imashimizo et al. . | |
| 5,488,809 | 2/1996 | Lindsay | 52/143 |
| 5,579,622 | 12/1996 | De Von et al. . | |
| 5,784,849 | 7/1998 | De Von et al. | 52/653.1 |

*Primary Examiner*—Carl D. Friedman
*Assistant Examiner*—Phi Dieu Tran A
*Attorney, Agent, or Firm*—Frijouf, Rust & Pyle, P.A.

[57] ABSTRACT

An improved modular support assembly is disclosed for reinforcing an end of a transverse beam disposed upon a longitudinally extending beam of a manufactured home. The modular support comprises a truss portion comprising an upper member, a depending member and a brace. The upper member is positioned to be supported by the longitudinally extending beam. The depending member is connected to extend downwardly from the upper member. The brace interconnects the upper member and the depending members. The truss portion is connected to the transverse beam for enabling the brace to coact with the longitudinally extending beam of a manufactured home for providing a bracing between the upper member and the longitudinally extending beam for supporting the end of the transverse beam thereby.

4 Claims, 16 Drawing Sheets

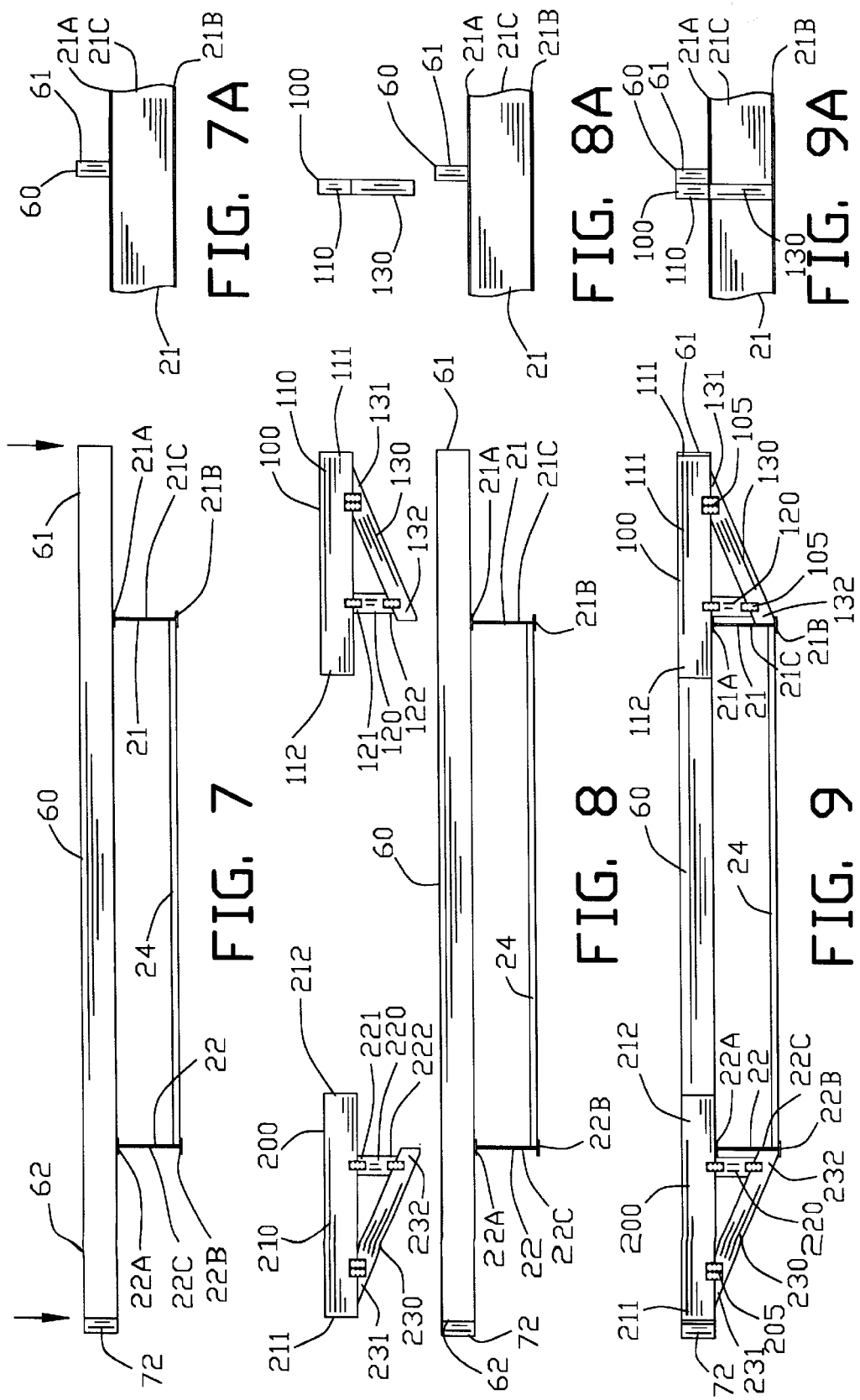

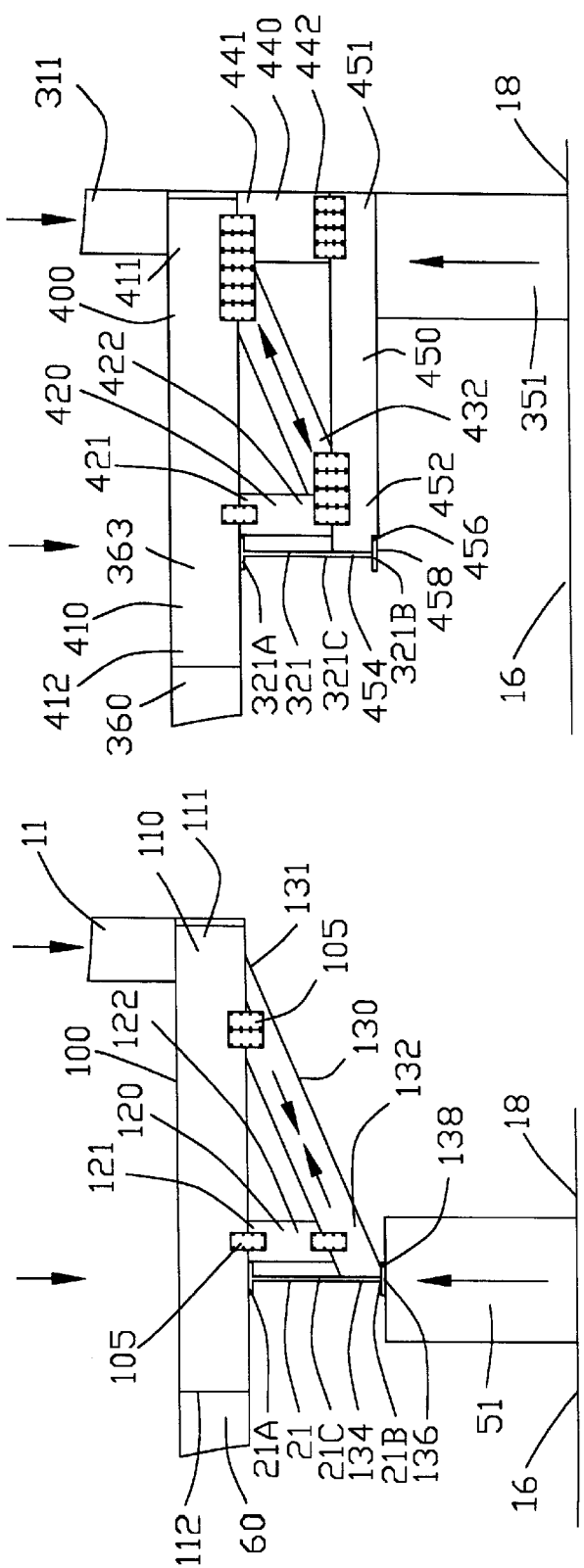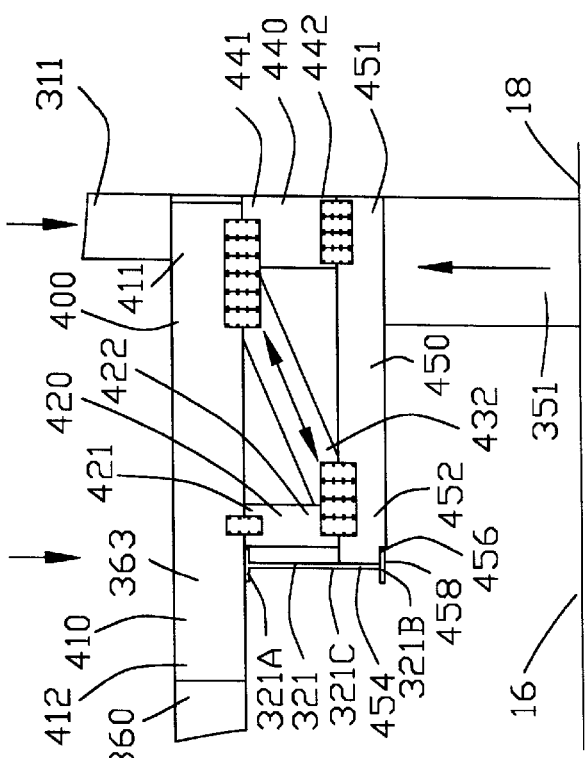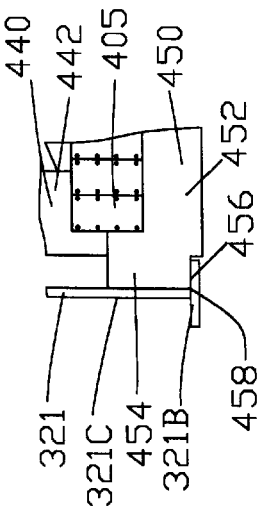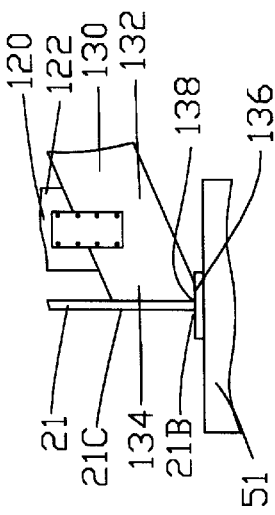

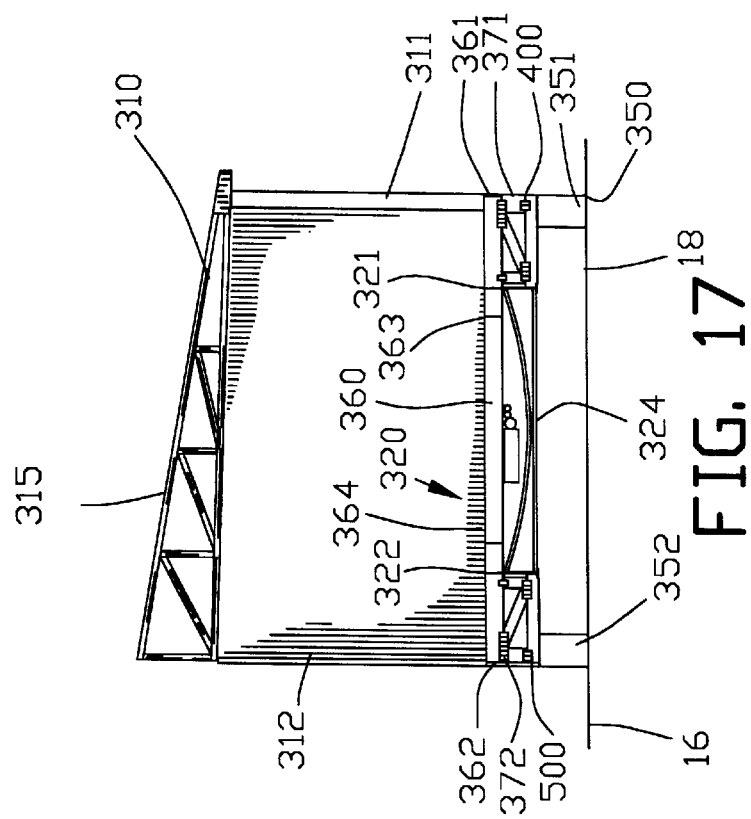
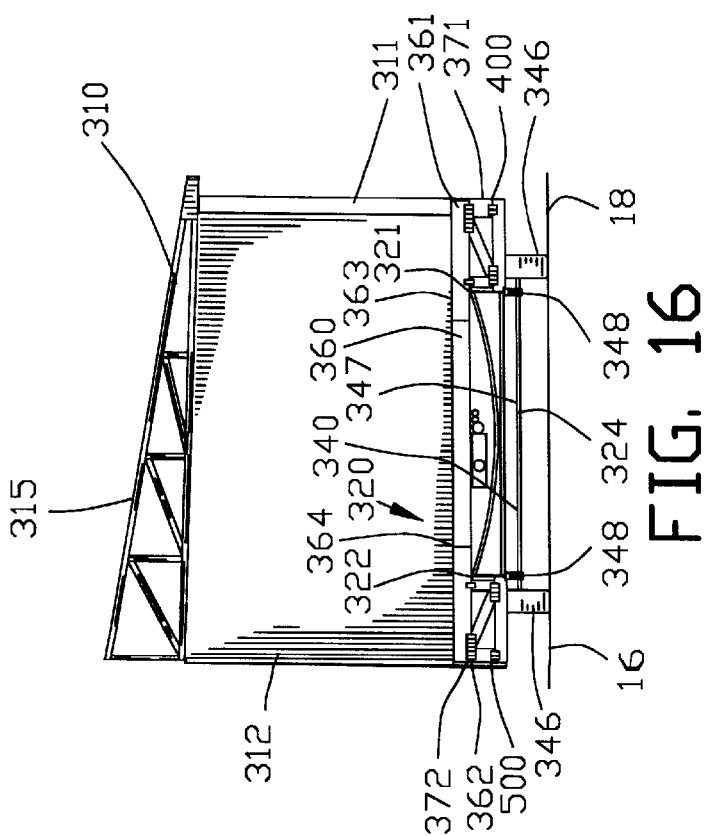

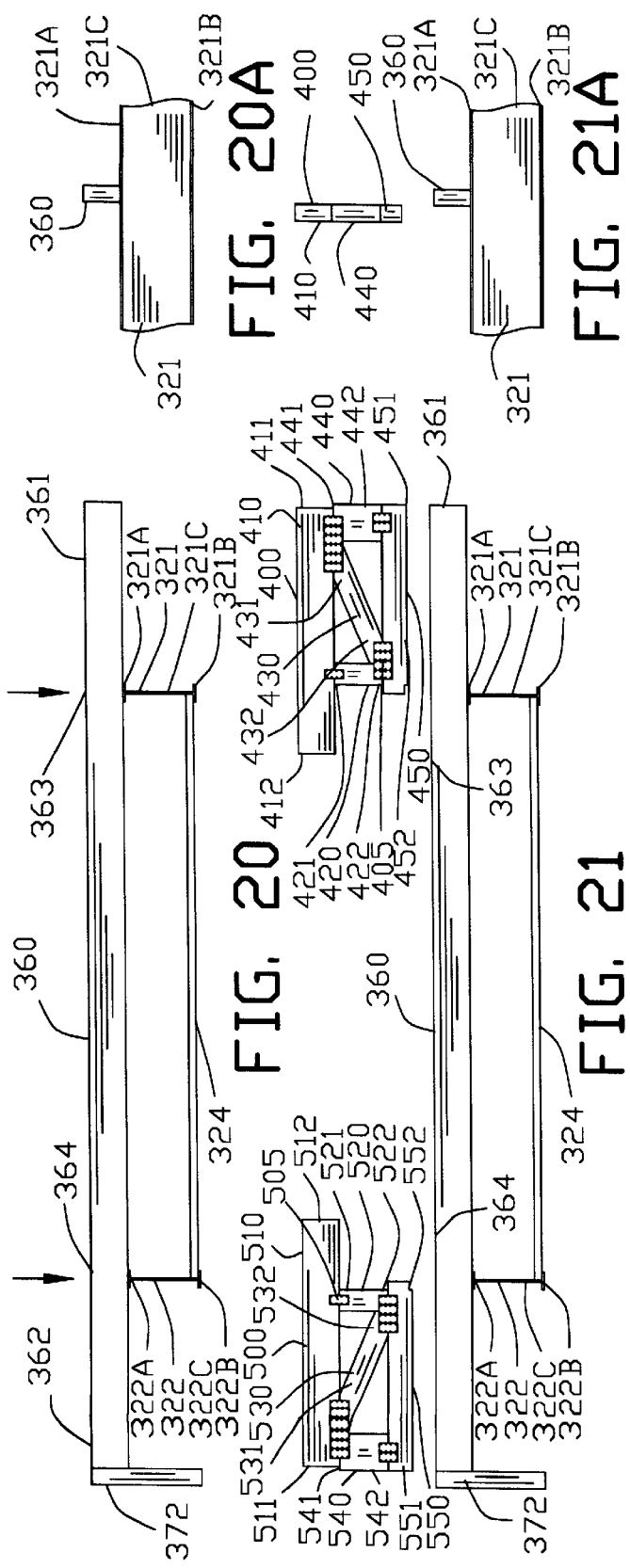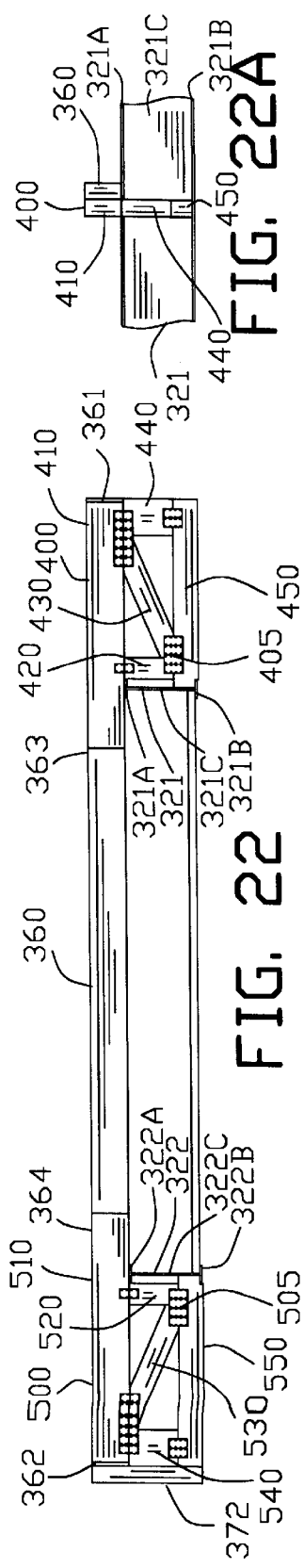

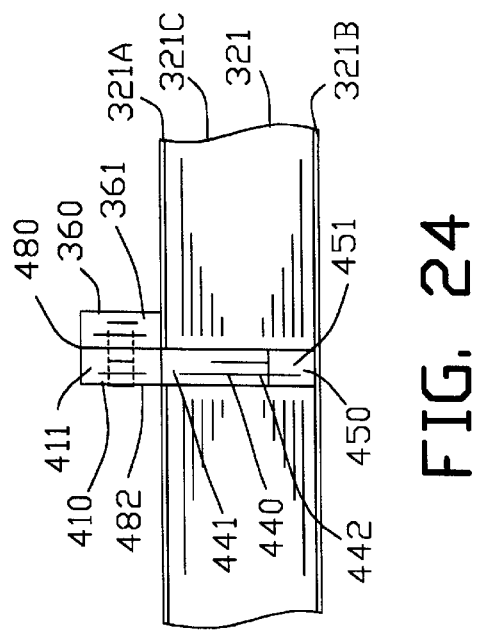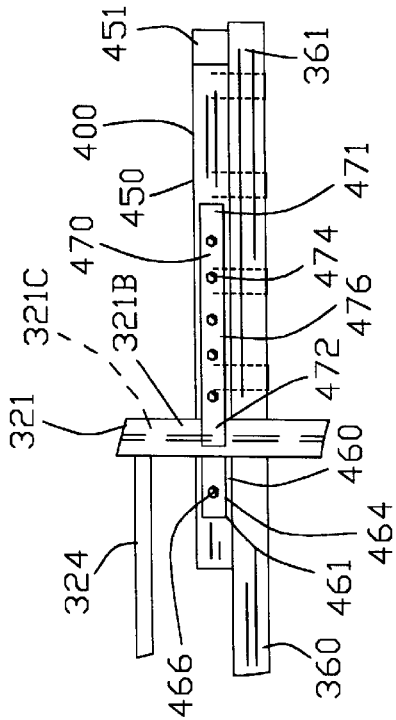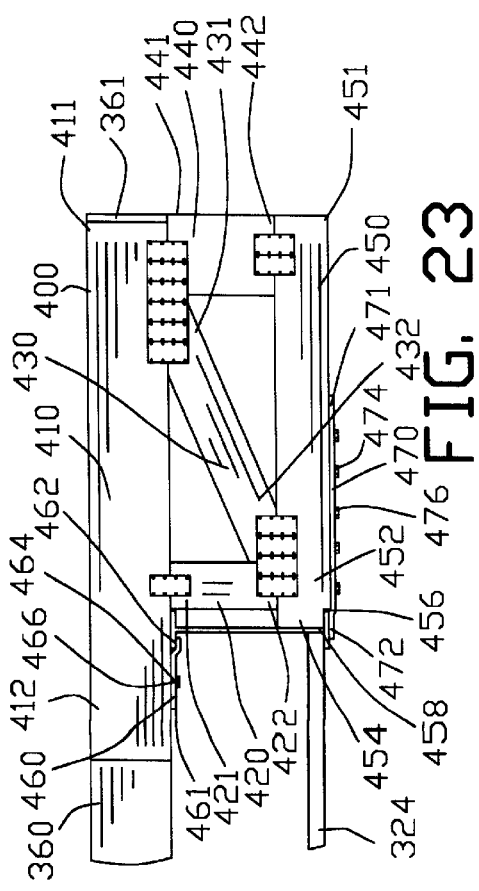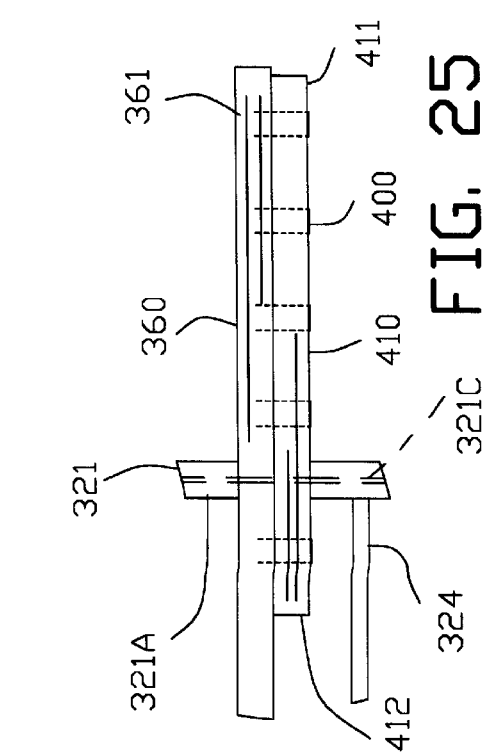

MODULAR SUPPORT ASSEMBLY

CROSS REFERENCE TO RELATED APPLICATIONS

This application claims priority to U.S. Provisional Application Ser. No. 60/050,204 filed Jun. 19, 1997 the entire content of which is incorporated by reference into the present application.

BACKGROUND OF THE INVENTION

1. Field of the Invention

This invention relates to manufactured homes and more particularly to an improved modular support assembly for a manufactured home.

2. Background of the Invention

In recent years, the manufactured home industry has substantially increased the quality of materials and construction of manufactured homes. This increase in quality and construction has been the result of superior materials, superior construction techniques, and new innovations which have resulted in a substantial increase in performance with a reduction in cost.

In general, a manufactured home is erected in an automated manufacturing factory using modern patterns, assembly line, and modern assembly equipment. The use of these automation techniques substantially reduces the cost and the time of construction of the manufactured home. After the manufactured home is completed, the manufactured home is stored on supports to await transportation to a permanent site for the manufactured home.

The manufactured home is loaded on a transportation carrier for transportation to the permanent site for the manufactured home. The manufactured home is positioned onto the transportation carrier by crane or other lifting means. The transportation carrier comprises a steel frame assembly supported by plural axles and transport wheels. The transportation carrier includes a hitch for attaching the transportation carrier to a towing vehicle such as a truck for transporting the manufactured home to the permanent site.

After the manufactured home is towed to the permanent site, the manufactured home is removed from the transportation carrier by a crane or other lifting means and the manufactured home is positioned on a foundation at the permanent home site. After removal of the manufactured home, the carrier transport is towed back to the manufacturing factory by a towing vehicle such as a truck for use in delivering another manufactured home. Unfortunately, the carrier transport is returned to the manufacturing factory without a load thereby substantially increasing the overall cost of delivery of the manufactured home. It is estimated that the cost of returning the carrier transport to the manufacturing factory is approximately one dollar per mile. Furthermore, the task of moving the manufactured home from the carrier transport to the foundation at the permanent home site requires the use of a crane or other lifting means. Accordingly, the transportation and installation of manufactured homes requiring the use of a carrier transport substantially adds to the overall cost of the manufactured home.

Among the most significant construction innovations developed in the manufactured home industry is the use of a dual purpose flooring system for a manufactured home. The dual purpose flooring system for a manufactured home comprises plural longitudinally extending beams and a multiplicity of transverse cross beams. The plural longitudinally extending beams are preferably steel I-beams with the multiplicity of transverse cross beams comprising wooden trusses.

The dual purpose flooring system provides a first function for the manufactured home by providing a removable transport wheel assembly and a removable hitch assembly for transporting the manufactured home to the permanent home site. A removable transport wheel assembly and a removable hitch assembly are secured to the plural longitudinally extending beams for transporting the manufactured home and eliminating the need for an independent transportation carrier. When the manufactured home reaches the permanent home site, the removable transport wheel assembly and a removable hitch assembly are removed from the manufactured home and are shipped to the manufacturing factory. Only the removable transport wheel assembly and a removable hitch assembly which comprise the most expensive portions of a transport carrier need to be returned to the manufacturing factory. In addition, the removable transport wheel assembly and a removable hitch may be returned to the manufacturing factory by a conventional freight carrier thus eliminating the need for using the towing vehicle as was the problem in the prior art manufactured home carrier transports.

The dual purpose flooring system provides a second function for the manufactured home by reducing the overall height of the manufactured home when the manufactured home is being transported to the permanent home site. Since the removable transport wheel assembly and the removable hitch assembly are directly secured to the plural longitudinally extending beams of the manufactured home, the dual purpose flooring system reduces the overall height of the manufactured home during transportation by the thickness of the frame of the carrier transport of the prior art.

The dual purpose flooring system provides a second function for the manufactured home by providing a rigid floor for supporting the manufactured home at the permanent home site. The plural longitudinally extending beams remain with the manufactured home after removal of the removable transport wheel assembly and the removable hitch assembly to provide a rigid support to the permanently mounted manufactured home. The plural longitudinally extending beams remain with the manufactured home to add to the structural integrity and strength of the flooring system. Several examples of the aforementioned dual purpose flooring system are disclosed in the following U.S. Letters Patent of the present inventor.

U.S. Pat. No. 4,019,299 to Lindsay discloses an improved floor assembly being incorporated into a mobile building. A pair of identical frame assemblies form the floor of the building each including a plurality of middle beams mounted to and atop lower beams and further including a pair of adjacent interior sidewalls attached to the middle beams and extending therebeneath being adjacent the lower beams. The exterior sidewalls are mounted to the frame assemblies. Wheeled carriages are removably mountable to the assemblies facilitating transportation of the assemblies to a building site. A skirt is permanently mounted externally to the sidewalls and extends adjacent the floor assembly. A bracket is connected to the middle beam and the bottom beam of each frame assembly and in addition is connected to a pole which supports the adjacent middle portions of the frame assemblies. The interior sidewalls are slidably received in the bracket. In an alternate embodiment, the floor frame assembly is incorporated into a floor joist.

U.S. Pat. No. 4,863,189 to Lindsay discloses a floor frame assembly, formed principally of wood material, having two load-bearing outer beams and front and rear end members defining a periphery and a plurality of transverse load-supporting trusses connected normal to the outer beam between the end members. In a preferred embodiment, each truss has an upper elongate member, a shorter central elongate member attached parallel thereto by vertical cross-braced elements, and on either side of the central member a braced vertical member spaced therefrom to provide gaps of predetermined height and width. Each truss also has an end portion of the upper elongate member in cantilever form for contact thereat with a load-supporting surface at the permanent location of the floor assembly, so that additional external beams or continuous wall surfaces to support the completed floor frame assembly and any superstructure thereon is rendered unnecessary. The floor frame assembly may be further supported by conventional piers or jackposts at points under two elongate, load-supporting, inner beams closely received and connected to the trusses within the gaps. These inner beams may optionally be made of wood material, wood material supported along the edges at selected portions by metal reinforcement, or entirely formed of I-section beam lengths. In one aspect of the invention, at least one of the load-supporting outer beams has a larger vertical dimension than the other outer beam and two floor frame assemblies thus formed may be united at their respective wider outer beams and provide additional support thereunder to generate a commensurately larger floor frame assembly structure.

U.S. Pat. No. 5,028,072 to Lindsay discloses a unified floor frame assembly having two elongate outer load supporting beams formed of elongate beam sections that are butt-spliced to be cambered in parallel vertical planes to counter forces that may tend to cause sagging of the floor frame assembly during transportation. At inner vertical perimeter surfaces of the elongate beams are provided attachment plates for attachment, first, of a wheel carrier assembly detachably mountable thereto with a plurality of wheels partially recessed within the floor frame assembly and, second, a towing hitch assembly attachable to a forward end of the floor frame assembly for applying a towing force thereat. A moisture, dirt, insect and pest excluding thin covering is provided underneath the floor frame assembly and sections of heating and ventilating ducting, piping, wiring and the like are included during manufacture of the floor frame assembly. Individual floor frame assemblies may be supported at their permanent location underneath the periphery or, where two such floor frame assemblies are to be coupled to obtain a larger size floor, central elongate beams may be supported by metal posts. Upon delivery of the floor frame assembly to its intended location, the wheel carrier assembly and the towing hitch assembly are both detached and removed therefrom for reuse.

U.S. Pat. No. 5,201,546 to Lindsay discloses a towable unified floor frame assembly deriving lengthwise strength from two elongate I-beams disposed symmetrically about a longitudinal axis. The I-beams are separated by a plurality of angle-sectioned metal cross members welded therebetween. A plurality of trusses, corresponding in number and location to the metal cross members, is disposed to support an outer perimeter and a floor thereabove. Each truss incorporates upwardly inclined bracing elements located outwardly of the I-beams connected to flat metal connecting elements individually unified to the I-beams, preferably by welding. A waterproof and dirt excluding cover entirely covers the underneath of the floor frame assembly. Heating and ventilating ducts, power and telephone wires, water and waste pipes, thermal insulation and the like, are installed within the floor frame assembly. The entire floor frame assembly, and any superstructure built thereon, may be readily towed to a selected location on a plurality of wheels detachably mounted to brackets provided underneath the I-beams, a towing force being applied by a forwardly disposed detachable towing hitch.

U.S. Pat. No. 5,488,809 to Lindsay discloses a lightweight, strong, safely transportable modular unified floor assembly including a lengthwise wooden girder beam formed with male and female ends to facilitate cooperative integration thereby to another similar floor assembly. In another aspect of the invention, the floor assembly is manufactured with a stairwell opening of selected size and at a selected location. The floor assembly even with a stairwell opening according to this invention is strong enough to be transported comfortably and safely from its point of manufacture to the site at which it is to be located for use.

A significant improvement in the dual purpose floor system is set forth in my U.S. Pat. No. 4,863,189 and my U.S. Pat. No. 5,201,546. In these patents, I disclosed a transverse beam for interconnecting a first and a second I-beam for creating a dual purpose floor system. The transverse beams in combination with the first and second I-beams provided a strength sufficient for transporting the manufactured home to the permanent home site and for providing a rigid floor after the manufactured home is installed at the permanent home site. These improved transverse beams worked remarkably well and provided a substantial improvement to the manufactured home industry.

The transverse beam incorporated a first and a second slot for respectively receiving a first and a second I-beam. When the first and second I-beams were disposed within the first and second slots, a metal connecting element or bearing block was inserted between each of the first and transverse beam and each of the first and second I-beams. The metal connecting elements or bearing blocks was required to engage a side surface of the vertical portion of the I-beam that is recessed relative to the top horizontal portion of the I-beam. The metal connecting element or the bearing block was manually inserted between the transverse beam and the first and second I-beams.

In some cases, the transverse beams were manufactured at a remote location from the manufacturing factory of the manufactured home. These transverse beams have a length of nine to fourteen feet in length. In such instances, the cost of transporting the transverse beams to the manufacturing factory was a significant part of the cost of the transverse beam.

It is a primary purpose of the present invention to improve upon the aforementioned dual purpose flooring system to provide a more superior manufactured home. It is a specific purpose of the present invention to provide an improved modular support for a manufactured home which enhances the aforementioned transverse beams.

Another object of this invention is to provide an improved modular support for a manufactured home for reinforcing the terminal ends of the transverse beam of the manufactured home.

Another object of this invention is to provide an improved modular support for a manufactured home for reinforcing the transverse beam of the manufactured home which may be installed after the transverse beams are affixed in place.

Another object of this invention is to provide an improved modular support for a manufactured home for reinforcing the transverse beam of the manufactured home which may be installed with different spacings for accommodating for different loadings of the manufactured home.

Another object of this invention is to provide an improved modular support for a manufactured home that is capable of easy transportation to the manufacturing factory for assembly thereat.

Another object of this invention is to provide an improved modular support for a manufactured home wherein the modular components of the modular support may be transported in component form and assembled at the manufacturing factory to provide a substantial savings in shipping costs.

Another object of this invention is to provide an improved modular support for a manufactured home that is capable of accommodating manufactured homes of variable size and width.

Another object of this invention is to provide an improved modular support for a manufactured home that eliminates the need for metal connecting elements or bearing blocks.

Another object of this invention is to provide an improved modular support for a manufactured home that is adaptable to existing manufacturing processes of manufactured homes.

Another object of this invention is to provide an improved modular support for a manufactured home that facilitates the assembly of the manufactured home in the manufacturing factory.

Another object of this invention is to provide an improved modular support for a manufactured home that reduces the overall cost of the manufactured home.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description setting forth the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved modular support assembly for reinforcing an end of a transverse beam disposed upon a longitudinally extending beam of a manufactured home. The improved modular support assembly comprises a truss portion comprising an upper member, a depending member and a brace. The upper member is positioned to be supported by the longitudinally extending beam. The depending member is connected to extend downwardly from the upper member. The brace interconnects the upper member and the depending members. The truss portion is connected to the transverse beam for enabling the brace to coact with the longitudinally extending beam of a manufactured home for providing a bracing between the upper member and the longitudinally extending beam for supporting the end of the transverse beam thereby.

In a more specific embodiment of the invention, the first and second longitudinally extending beams are disposed in a substantially parallel orientation. In one embodiment of the invention, the first and second longitudinally extending beams are constructed of a metallic material. Preferably, each of the first and second longitudinally extending beams is an I-beam having an upper horizontal element, a lower horizontal element and an interconnecting vertical element. The first and second truss portions are mirror images of one another. The first and second upper members respectively extend in a substantially horizontal direction. In one embodiment of the invention, a first and a second lower member respectively extend substantially parallel to the first and second upper members.

The first and second depending members respectively extend in a substantially vertical direction. In one embodiment of the invention, a first and a second outer depending member respectively extend substantially parallel to the first and second depending members.

The first and second braces extend angularly relative to the first and second upper members, respectively. The first and second braces may extend angularly relative to the first and second depending members, respectively.

In one embodiment of the invention, the improved modular transverse beam assembly includes a first truss portion comprising a first upper member, a first depending member and a first brace and a second truss portion comprising a second upper member, a second depending member and a second brace. The first and second upper members are positioned to be supported by the first and second longitudinally extending beams with the first and second ends of the first and second upper members overhanging the first and second longitudinally extending beams. The first and second depending members are connected to extend downwardly from the first and second upper members, respectively. The first and second braces respectively interconnect the first and second upper members and the first and second depending members. The first and second truss portions are connected to the first and second ends of the transverse beam for enabling the first and second braces to coact respectively with the first and second longitudinally extending beams for providing a bracing between the first and second upper member and the first and second longitudinally extending beams for supporting the first and second ends of the transverse beam thereby. Preferably, the first and second truss portions are mirror images of one another.

In one embodiment of the invention, the improved modular support assembly includes a first and a second outer depending member respectively extending substantially parallel to the first and second depending members. A first and a second lower member respectively interconnects the first and second outer depending members to the first and second depending members.

In one embodiment of the invention, the first and second braces coact with the vertical element of the first and second longitudinally extending beams. In another embodiment of the invention, the first and second braces coacting with a vertical element of the first and second longitudinally extending beams through the first and second lower member respectively.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 7 is an enlarged end view of FIG. 6 illustrating a transverse beam being disposed on a first and a second longitudinally extending beam;

FIG. 7A is a right side view of FIG. 7;

FIG. 8 is a view similar to FIG. 7 illustrating the positioning of a first and a second truss portion relative to the transverse beam;

FIG. 8A is a right side view of FIG. 8;

FIG. 9 is a view similar to FIG. 8 illustrating the securing of the first and second truss portions relative to the transverse beam;

FIG. 9A is a right side view of FIG. 9;

FIG. 10A is a further magnified view of a portion of FIG. 10;

FIG. 16 is an end view of FIG. 15 illustrating the manufactured home disposed on the carrier transport;

FIG. 17 is an end view of the manufactured home of FIG. 15 which has been removed from the carrier transport of FIG. 16 and placed upon a piling foundation;

FIG. 20 is an enlarged end view of FIG. 19 illustrating a transverse beam being disposed on a first and a second longitudinally extending beam;

FIG. 20A is a right side view of FIG. 20;

FIG. 21 is a view similar to FIG. 20 illustrating the positioning of a first and a second truss portion relative to the transverse beam;

FIG. 21A is a right side view of FIG. 21;

FIG. 22 is a view similar to FIG. 21 illustrating the securing of the first and second truss portions relative to the transverse beam;

FIG. 22A is a right side view of FIG. 22;

FIG. 23 is a magnified view of a portion of FIG. 22;

FIG. 23A is a further magnified view of a portion of FIG. 23;

FIG. 24 is a right side view of FIG. 23;

FIG. 25 is a top view of FIG. 23;

FIG. 26 is a bottom view of FIG. 23;

FIG. 28 is a magnified view of a portion of FIG. 4 illustrating the forces applied to the first embodiment of the improved modular support assembly of the present invention; and FIG. 29 is a magnified view of a portion of FIG. 17 illustrating the forces applied to the second embodiment of the improved modular support assembly of the present invention.

Similar reference characters refer to similar parts throughout the several Figures of the drawings.

DETAILED DISCUSSION

Figure 1:
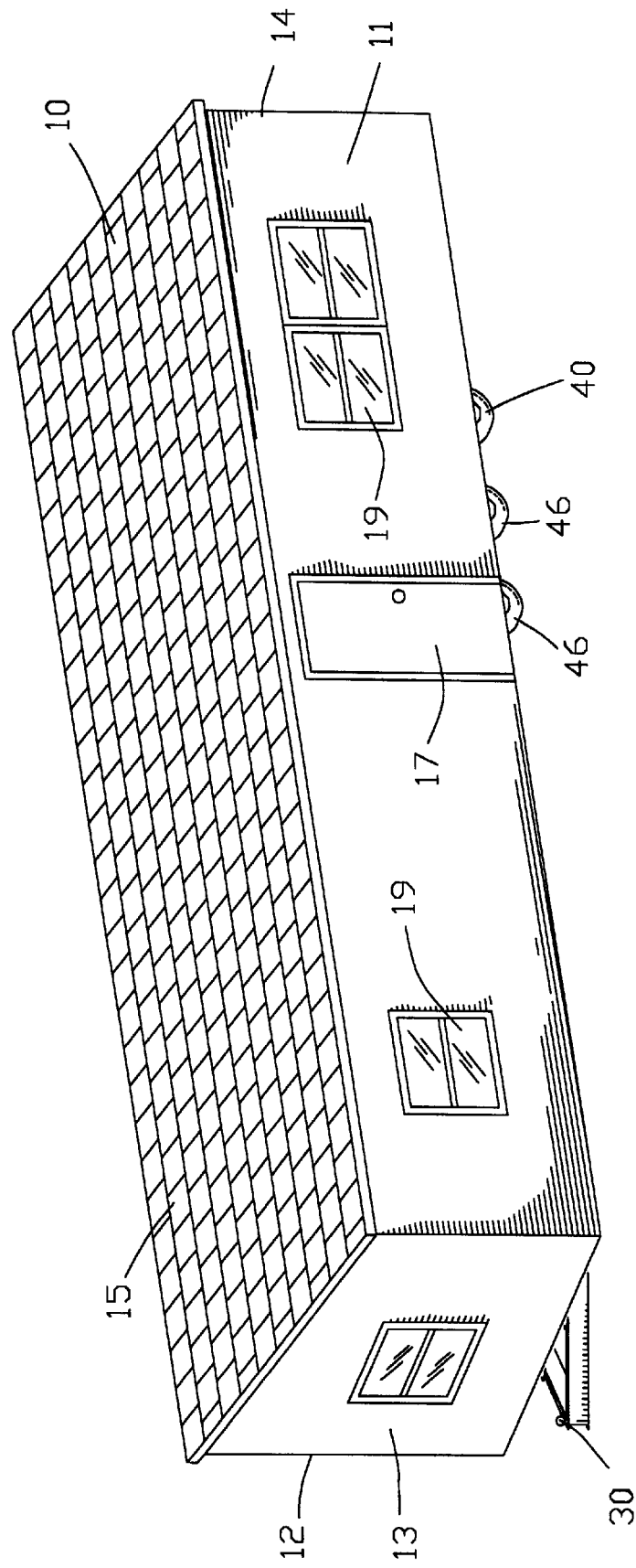
FIG. 1 is an isometric view of a first embodiment of a manufactured home incorporating the present invention.
Figure 2:
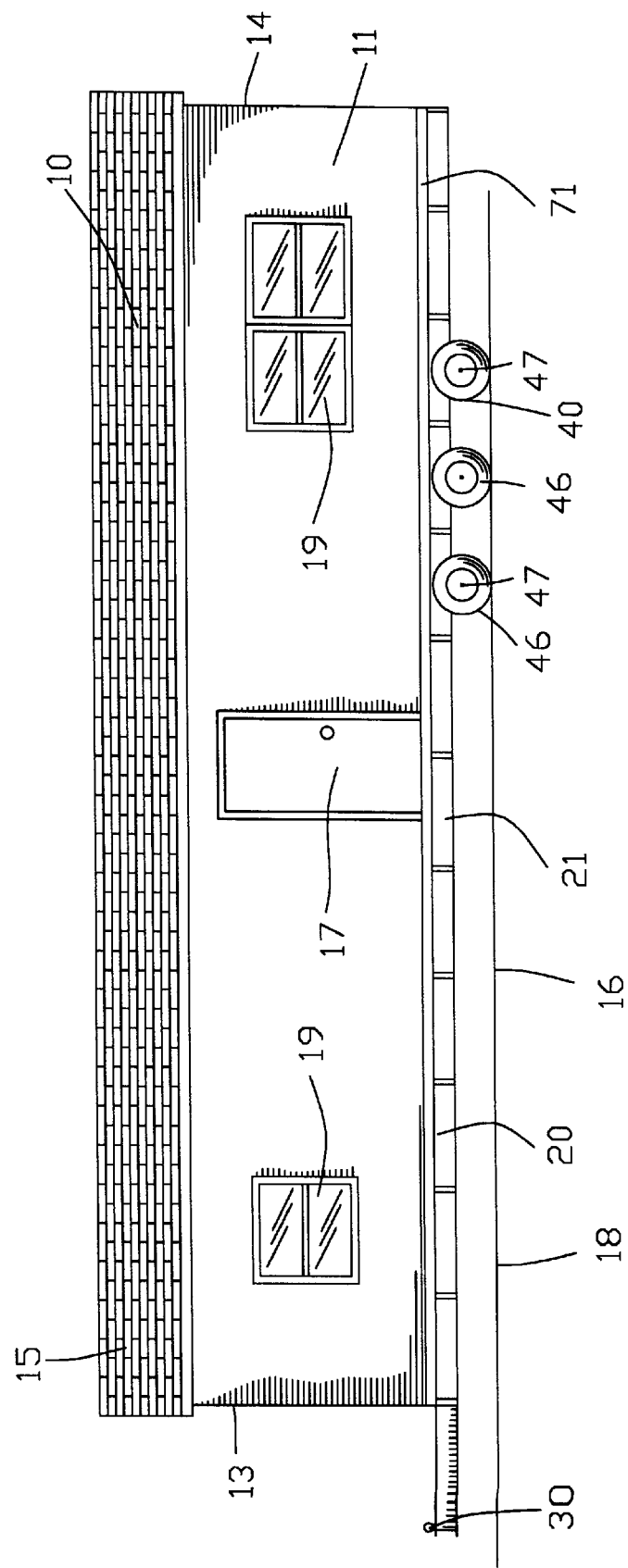
FIG. 2 is a side elevational view of FIG. 1.
Figure 3:
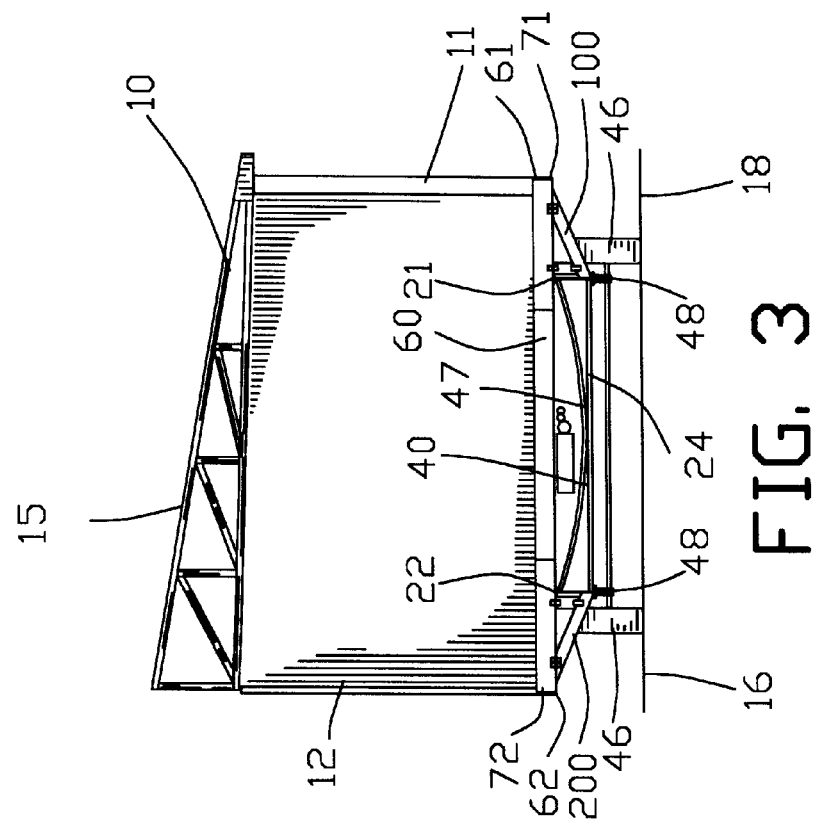
FIG. 3 is an end view of FIG. 2 illustrating the manufactured home disposed on the carrier transport.

FIGS. 1–3 are isometric, side and end views of a first embodiment of a manufactured home 10. The manufactured home 10 comprises peripheral walls 11 and 12, end walls 13 and 14 and a roof 15. The manufactured home 10 is designed to be transported to a remote location and to be erected on a ground surface 16 at a building site 18.

After the manufactured home 10 is completed at a manufacturing facility, the manufactured home 10 is towed by a towing vehicle such as a truck (not shown) to the building site 18. The manufactured home 10 is shown as one-half of a two-part unit commonly referred to as a double wide manufactured home 10. In the case of a double wide manufactured home 10, the peripheral wall 12 is only a partial wall enabling the manufactured home 10 to be joined with a mirror image of FIG. 3 at the peripheral wall 12 for creating the double wide manufactured home 10. The structure and erection of the double wide manufactured home 10 should be well known to those skilled in the art.

As best shown in FIG. 3, the manufactured home 10 is shown disposed on a longitudinally extending beam 20 shown as frame elements 21 and 22. Preferably, the frame elements 21 and 22 are steel I-beams separated by a plurality of struts 24. A removable hitch 30 and a plurality of removable wheel assemblies 40 enable the manufactured home 10 to be towed to the building site 18. Each of the plurality of wheel assemblies 40 has plural wheels 46 journalled on an axle 47. The plurality of wheel assemblies 40 are secured to the frame elements 21 and 22 by springs 48. Upon reaching the building site 18, the removable hitch 30 and the plurality of removable wheel assemblies 40 are removed and the manufactured home 10 is permanently mounted at the building site 18.

Figure 4:
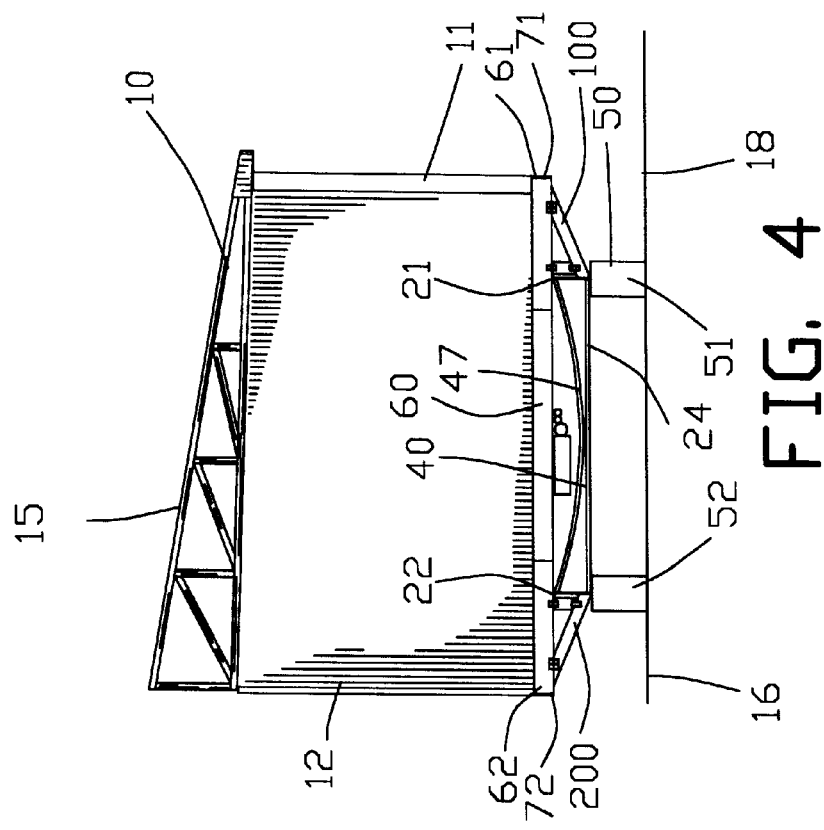
FIG. 4 is an end view of the manufactured home of FIG. 3 which has been removed from the carrier transport of FIG. 3 and placed upon a piling foundation.

FIG. 4 is an end view similar to FIG. 3 after the manufactured home 10 has been lifted and placed upon a foundation 50 comprising foundation pilings 51 and 52 on the ground surface 18. The manufactured home 10 is secured to the foundation pilings 51 and 52 by conventional means which should be well known to those skilled in the art.

The foundation pilings 51 and 52 extend upwardly from the ground surface 16 to space the manufactured home 10 from the ground surface 16. The foundation pilings 51 and 52 are commonly referred to as piers. The distance of the piers required to space the manufactured home 10 from the ground surface 16 is regulated by local or federal building codes or regulations.

Figure 5:
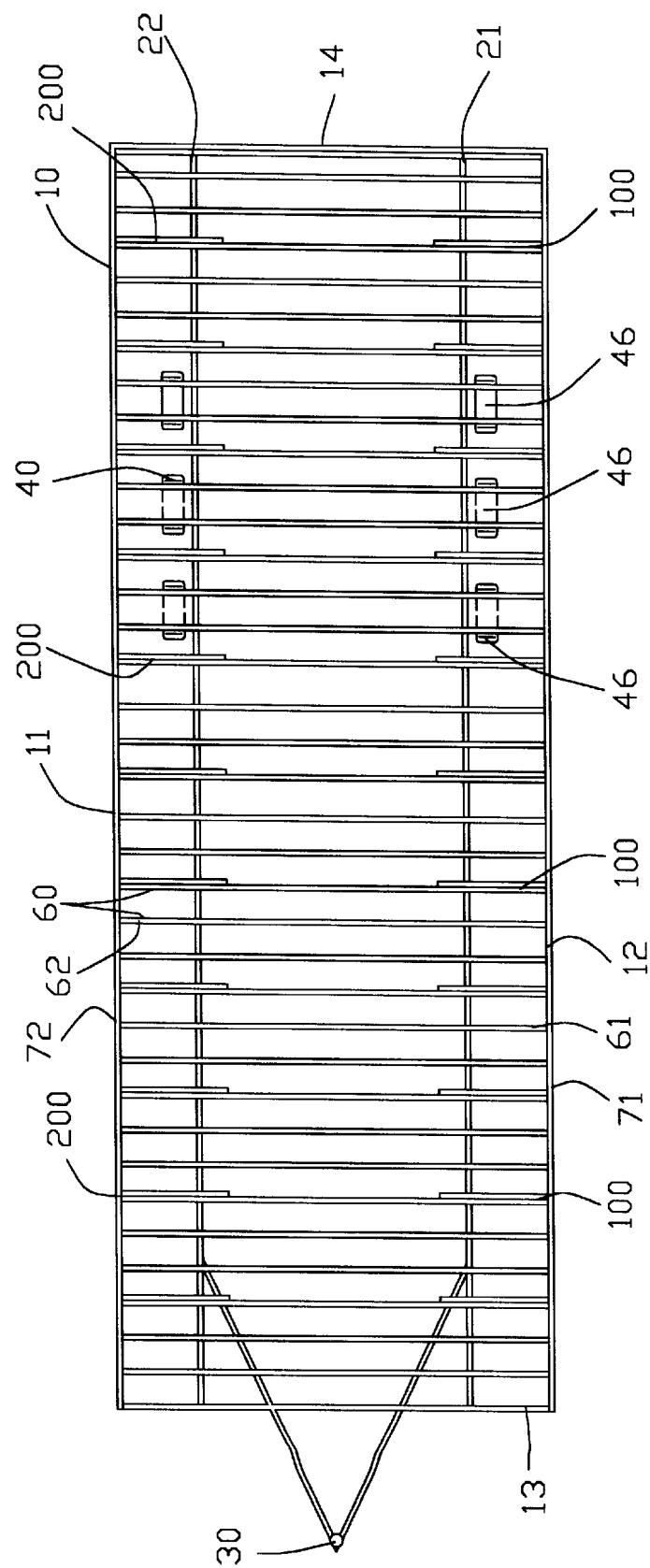
FIG. 5 is a top view of a floor frame of the manufactured home of FIGS. 1–4 incorporating the improved modular support assembly of the present invention.

FIG. 5 is a top view of a floor frame of the manufactured home 10 of FIGS. 1–4. The manufactured home 10 is supported by the longitudinally extending beams 20 shown as the first and second I-beams 21 and 22 constructed of a metallic material. The hitch 30 is removably secured to the first and second I-beams 21 and 22. In a similar manner, the plurality of wheel assemblies 40 are removably secured to the first and second I-beams 21 and 22. Upon reaching the building site 18, the hitch 30 and the plurality of wheel assemblies 40 are removed from the first and second I-beams 21 and 22 and the manufactured home 10 is permanently mounted at the building site 18.

Figure 6:
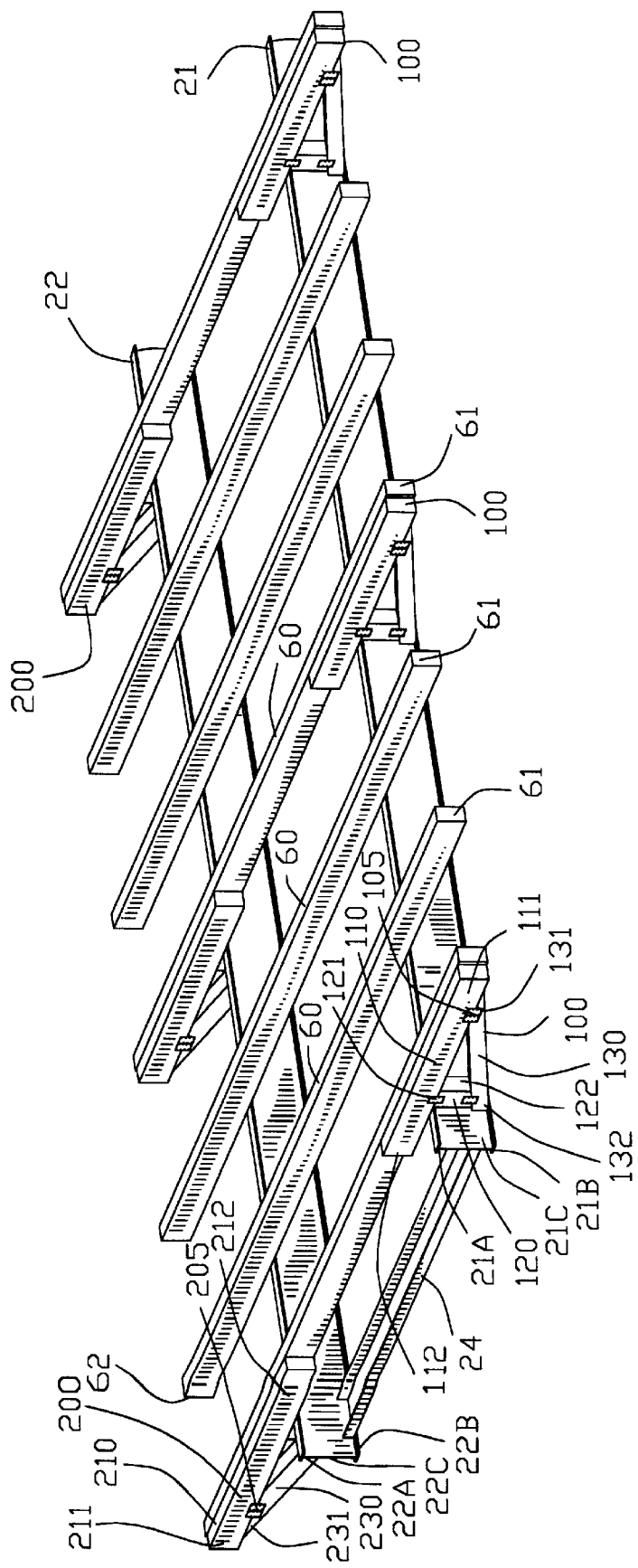
FIG. 6 is an enlarged isometric view of a portion of FIG. 5.

FIG. 6 is an enlarged isometric view of a portion of FIG. 5. The first I-beam 21 comprises an upper horizontal element 21A, a lower horizontal element 21B and an interconnecting vertical element 21C. In a similar manner, the second I-beam 22 comprises an upper horizontal element 22A, a lower horizontal element 22B and an interconnecting vertical element 22C.

The manufactured home 10 comprises a multiplicity of transverse beams 60 arranged in a substantially parallel relationship. Each of the multiplicity of transverse beams 60 comprises a first and a second end 61 and 62 extending outwardly with the first and second ends 61 and 62 overhanging the first and second longitudinally extending beams 21 and 22.

As best shown in FIGS. 1–4, a first and a second peripheral beam 71 and 72 are respectively connected to the first and second ends 61 and 62 of each of the multiplicity of transverse beams 60. The multiplicity of transverse beams 60 support the floor of the manufactured home 10 in a conventional manner. Typically, each of the multiplicity of transverse beams 60 is made of a wood material.

One problem encountered with the manufactured homes 10 of the prior art is caused by a deflection or a sagging of one or more of the transverse beams 60. This problem of deflection or sagging of the transverse beam 60 is most critical at the first and second ends 61 and 62 of the transverse beams 60.

As best seen in FIGS. 3 and 4, the first and second ends 61 and 62 of the transverse beam 60 support the walls 11 and 12 and support the roof 15. Furthermore, the first and second ends 61 and 62 of the transverse beam 60 support any load deposited on the roof 15 such as snow, ice or the like.

When the first and second ends 61 and 62 of the transverse beam 60 are deflected downward, the peripheral wall 11 is similarly distorted thereby changing the plumb or level of the manufactured home 10. In some circumstances, the distortion of the peripheral wall 11 inhibits the opening and closing of either the door 17 and/or the windows 19. To correct this problem of the downward deflection of the first and second ends 61 and 62 of the transverse beam 60, various types of shoring devices were employed by the prior art. The types of shoring device used is dependent upon the location and the extent of the downward deflection. All of these various type of shoring devices were expensive, time consuming and generally unsatisfactory to the purchaser of the manufactured home 10.

FIG. 6 is an enlarged isometric view of a portion of FIG. 5 illustrating a first embodiment of the improved modular support of the present invention for reinforcing the first and second ends 61 and 62 of the transverse beam 60. The improved modular support comprises a first and second truss portion 100 and 200 that are mirror images of one another.

The first truss portion 100 comprises a first upper member 110 having a first and a second end 111 and 112. The first upper member 110 of the first truss portion 100 is positioned to be supported by the upper horizontal beam element 21A of the first longitudinally extending beam 21. Preferably, the first upper member 110 of the first truss portion 100 is positioned to extend in a substantially horizontal direction.

The first truss portion 100 comprises a first depending member 120 having a first and a second end 121 and 122. The first end 121 of the first depending member 120 is connected to the first upper member 110 adjacent to the second end 112 thereof. The first depending member 120 of the first truss portion 100 is positioned to extend downwardly from the first upper member 110 and preferably, to extend downwardly in a substantially vertical direction.

The first truss portion 100 comprises a first brace 130 having a first and a second end 131 and 132. The first end 131 of the first brace 130 is connected to the first end 111 of the first upper member 110 with the second end 132 of the first brace 130 being connected to the second end 122 of the first depending member 120. The first brace 130 of the first truss portion 100 is positioned to extend angularly relative to the first upper member 110.

Preferably, the first truss portion 100 is made from a wood material with the first upper member 110, the first depending member 120 and the first brace 130 being interconnected by a plurality of mechanical fasteners 105.

The second truss portion 200 comprises a second upper member 210 having a first and a second end 211 and 212. The second upper member 210 of the second truss portion 200 is positioned to be supported by the upper horizontal beam element 22A of the second longitudinally extending beam 22. The second upper member 210 of the second truss portion 200 is positioned to extend in a substantially horizontal direction.

The second truss portion 200 comprises a second depending member 220 having a first and a second end 221 and 222. The first end 221 of the second depending member 220 is connected to the second upper member 210 adjacent to the second end 212 thereof. The second depending member 220 of the second truss portion 200 extends downwardly from the second upper member 210 and preferably extends downwardly in a substantially vertical direction.

The second truss portion 200 comprises a second brace 230 having a first and a second end 231 and 232. The first end 231 of the second brace 230 is connected to the first end 211 of the second upper member 210 with the second end 232 of the second brace 230 being connected to the second end 222 of the second depending member 220. The second brace 230 of the second truss portion 200 is positioned to extend angularly relative to the second upper member 210.

Preferably, the second truss portion 200 is made from a wood material with the second upper member 210, the second depending member 220 and the second brace 230 being interconnected by a plurality of mechanical fasteners 205.

FIG. 7 is an enlarged end view of FIG. 6 illustrating a transverse beam 60 disposed on the first and second longitudinally extending beams 21 and 22 with FIG. 7A being a right side view of FIG. 7. The first and second ends 61 and 62 of the transverse beam 60 overhang the first and second longitudinally extending beams 21 and 22. For purposes of illustration, the first peripheral beam 71 is absent from the first end 61 of the transverse beams 60 whereas the second peripheral beam 72 is shown connected to the second end 62 of the transverse beams 60.

Since the first and second ends 61 and 62 of the transverse beams 60 support the walls 11 and 12 and the roof 15, a downward deflection may be encountered at the first and second ends 61 and 62 of the transverse beams 60 as shown by the arrows.

FIG. 8 is a view similar to FIG. 7 illustrating the positioning of the first and second truss portions 100 and 200 relative to the first and second ends 61 and 62 of the transverse beam 60. FIG. 8A is a right side view of FIG. 8. The first and second truss portions 100 and 200 may be affixed to selected ones of the multiplicity of transverse beams 60 irrespective of whether the first and second peripheral beams 71 and 72 are absent from or affixed to the first and second ends 61 and 62 of the transverse beams 60.

FIG. 9 is a view similar to FIG. 8 illustrating the securing of the first and second truss portions 100 and 200 to the first and second ends 61 and 62 of the transverse beam 60. FIG. 9A is a right side view of FIG. 9. The first and second truss portions 100 and 200 reinforce the first and second end 61 and 62 of the transverse beam 60 to inhibit the downward deflection of the first and second ends 61 and 62 of the transverse beams 60 as shown by the arrows in FIG. 7.

A significant advantage of the present invention is the ability to customize a manufactured home 10 in accordance with a desired roof load. As shown in FIG. 5, the first and second truss portions 100 and 200 are spaced within the multiplicity of transverse beams 60. In the example shown in FIG. 5, the multiplicity of transverse beams 60 are spaced on 16 inch centers. The first and second truss portions 100 and 200 are spaced on 48 inch centers.

The present invention enables a manufacturer to space the first and second truss portions 100 and 200 in a spacing to correspond to a desired roof load of the manufactured home 10. Since the first and second truss portions 100 and 200 may be affixed to the transverse beams 60 irrespective of whether the first and second peripheral beams 71 and 72 are absent or affixed to the first and second ends 61 and 62 of the transverse beam 60, the first and second truss portions 100 and 200 may be installed just prior to the installation of the floor upon the multiplicity of transverse beams 60.

The following is a TABLE illustrating the desired roof load (in pounds per square foot) and the required spacing of the first and second truss portions 100 and 200 on transverse beams 60 located on 16 inch centers.

| DESIRED ROOF LOAD | TRANSVERSE BEAMS | TRUSS PORTIONS |
| --- | --- | --- |
| 20 | 16" | 96" |
| 40 | 16" | 48" |
| 80 | 16" | 32" |
| 100 and over | 16" | 16" |

The use of the first and second truss portions 100 and 200 enable a manufacturer of the manufactured home 10 to quickly and easily modify the manufactured home 10 during the construction process to comply with the building requirements of different regions of the country. For example, a region of the country subjected to heavy snowfall will require the manufactured home 10 to have a higher roof load requirement then a region of the country which is subjected only to light rain. The present invention enables a manufacturer of the manufactured home to use a common construction plan for both regions of the country while adapting the construction plan affixing an appropriate number of the first and second truss portions 100 and 200 to comply with the building requirements of the region of the country with the high snowfall.

Figure 11:
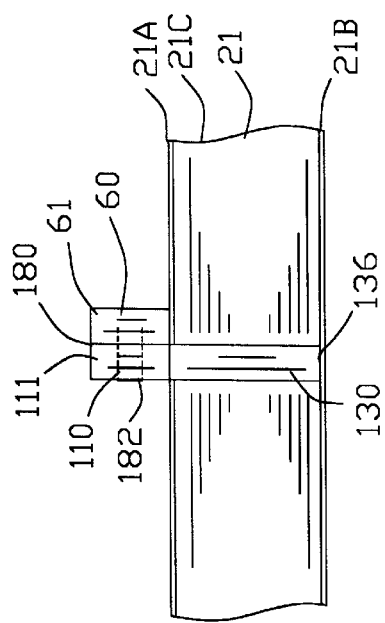
FIG. 11 is a right side view of FIG. 10.
Figure 10:
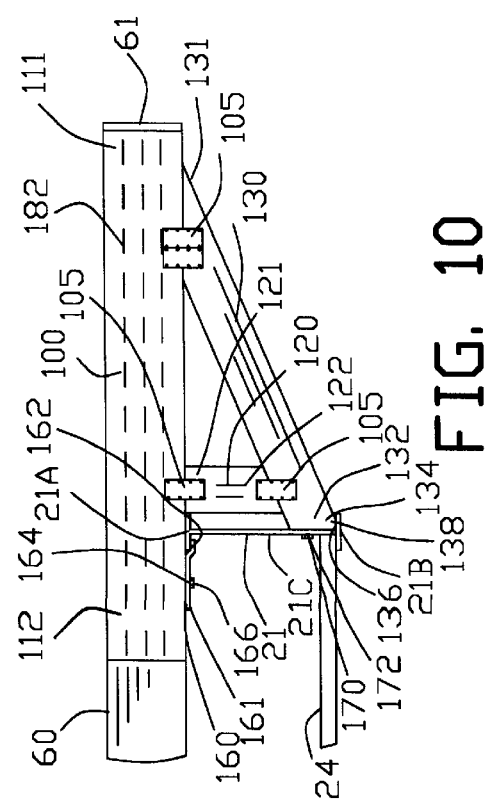
FIG. 10 is a magnified view of a portion of FIG. 9.
Figure 13:
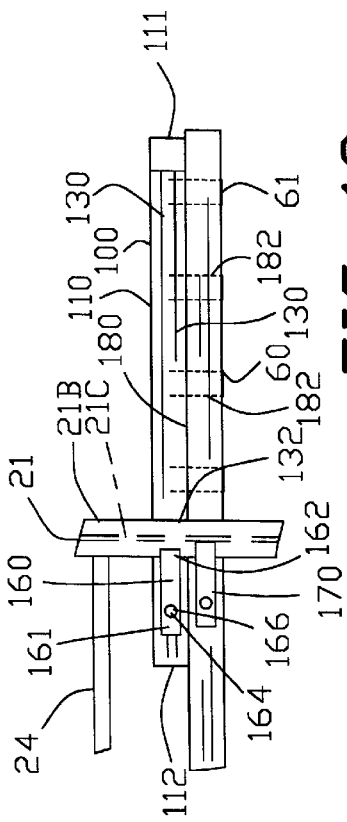
FIG. 13 is a bottom view of FIG. 10.
Figure 12:
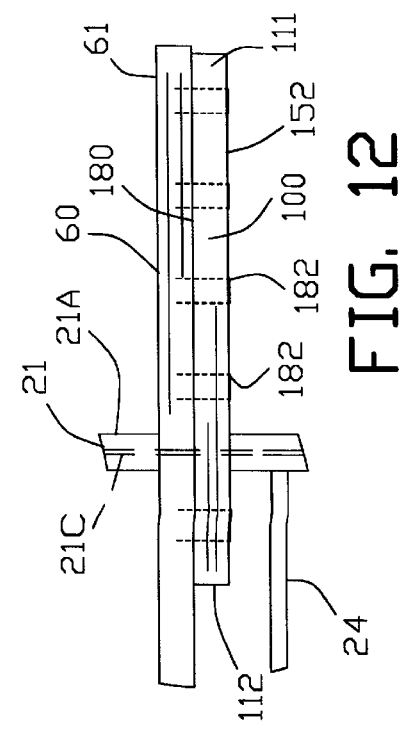
FIG. 12 is a top view of FIG. 10.

FIG. 10 is a magnified view of a portion of FIG. 9 with FIG. 11 being right side view of FIG. 10. FIGS. 12 and 13 are top and bottom views of FIG. 10. The transverse beam 60 is disposed upon the upper horizontal beam element 21A of the first longitudinally extending beam 21 of a manufactured home 10 with the first end 61 overhanging the first longitudinally extending beam 21.

The first truss portion 100 is positioned on the first longitudinally extending beam 21 of the manufactured home 10 with the first upper member 110 being positioned to be supported by the upper horizontal beam element 21A of the first longitudinally extending beam 21 adjacent to the transverse beam 60. The first upper member 110 overhangs the first longitudinally extending beams 21 in a parallel relationship to the transverse beam 60. The first depending member 120 engages with a side surface of the upper horizontal beam element 21A of the first longitudinally extending beam 21.

The first truss portion 100 is connected to the first longitudinally extending beam 21. A bracket 160 having a first and a second end 161 and 162 is connected to the upper horizontal beam element 21 A of the first longitudinally extending beam 21. The first end 161 of the bracket 160 includes an aperture 164 for receiving a mechanical fastener 166 such as a screw. The mechanical fastener 166 secures the first end 161 of the bracket 160 to the first upper member 110 of the first truss portion 100 with the second end 162 of the bracket 160 engaging with the upper horizontal beam element 21A of the first longitudinally extending beam 21. The first longitudinally extending beam 21 is contained on one side by the first depending member 120 and is contained on the other side by the bracket 160. A mechanical fastener 170 such as a screw extends through an aperture 172 defined in the interconnecting vertical element 21C of the I-beam 21 to threadably engage with the second end 132 of the brace 130. The bracket 160 and the mechanical fastener 170 secure the first truss portion 100 proximate to the upper horizontal element 21A and the lower horizontal element 21B of the first I-beam 21.

The brackets 160 and the mechanical fastener 170 maintain the first longitudinally extending beam 21 in alignment and inhibit the first longitudinally extending beam 21 from twisting. The twisting of the first longitudinally extending beam 21 substantially reduces the strength of the first longitudinally extending beam 21 and creates a substantial problem in the manufactured home industry.

The first truss portion 100 is secured to the first end 61 of transverse beam 60 by suitable means such as an adhesive 180, mechanical fasteners such as nails or staples 182 or a combination of both. The first truss portion 100 may be secured to the first end 61 of transverse beam 60 by an adhesive 180 with staples 182 holding the first truss portion 100 against the first end 61 of transverse beam 60 during the curing of the adhesive 180.

FIG. 10A is a further magnified view of a portion of FIG. 10. When the first truss portion 100 is positioned on the first longitudinally extending beam 21 and is secured to the first end 61 of transverse beam 60, the second end 132 of the first brace 130 coacts with the first longitudinally extending beam 21 for providing a bracing between the first upper member 110 and the first longitudinally extending beam 21 for supporting the first end 61 of the transverse beam 60. Preferably, the second end 132 of the first brace 130 extends beyond the first depending member 120 to create a projection 134 for engaging with the interconnecting vertical beam element 21C of the longitudinally extending beam 21 for providing a bracing between the first upper member 110 and the first longitudinally extending beam 21 for supporting the first end 61 of the transverse beam 60. The projection 134 enables the first depending member 120 to engage with the upper horizontal beam element 21A simultaneously with the projection 134 engaging with the interconnecting vertical beam element 21C when the first depending member 120 is substantially parallel to the interconnecting vertical beam element 21C of the first longitudinally extending beam 21. The projection 134 may include a diagonal cut 136 for creating a perpendicular corner 138. The perpendicular corner 138 enables the diagonal cut 136 to engage with the lower horizontal beam element 22B of the first longitudinally extending beam 21 when the projection 134 engages with the interconnecting vertical beam element 21C. Accordingly, both the interconnecting vertical beam element 21C as well as the lower horizontal beam element 22B of the first longitudinally extending beam 21 support the second end 132 of the first brace 130.

The projection 134, the diagonal cut 136 and the perpendicular corner 138 facilitate the installation of the first truss portion 100 as well as enabling the first truss portion 100 to be affixed to the transverse beams 60 irrespective of whether the first peripheral beam 71 is present or absent from the first end 61 of the transverse beams 60. Furthermore, the projection 134, the diagonal cut 136 and the perpendicular corner 138 eliminate the need for any shim blocks or bushings between the first truss portion 100 and the first longitudinally extending beam 21.

Figure 14:
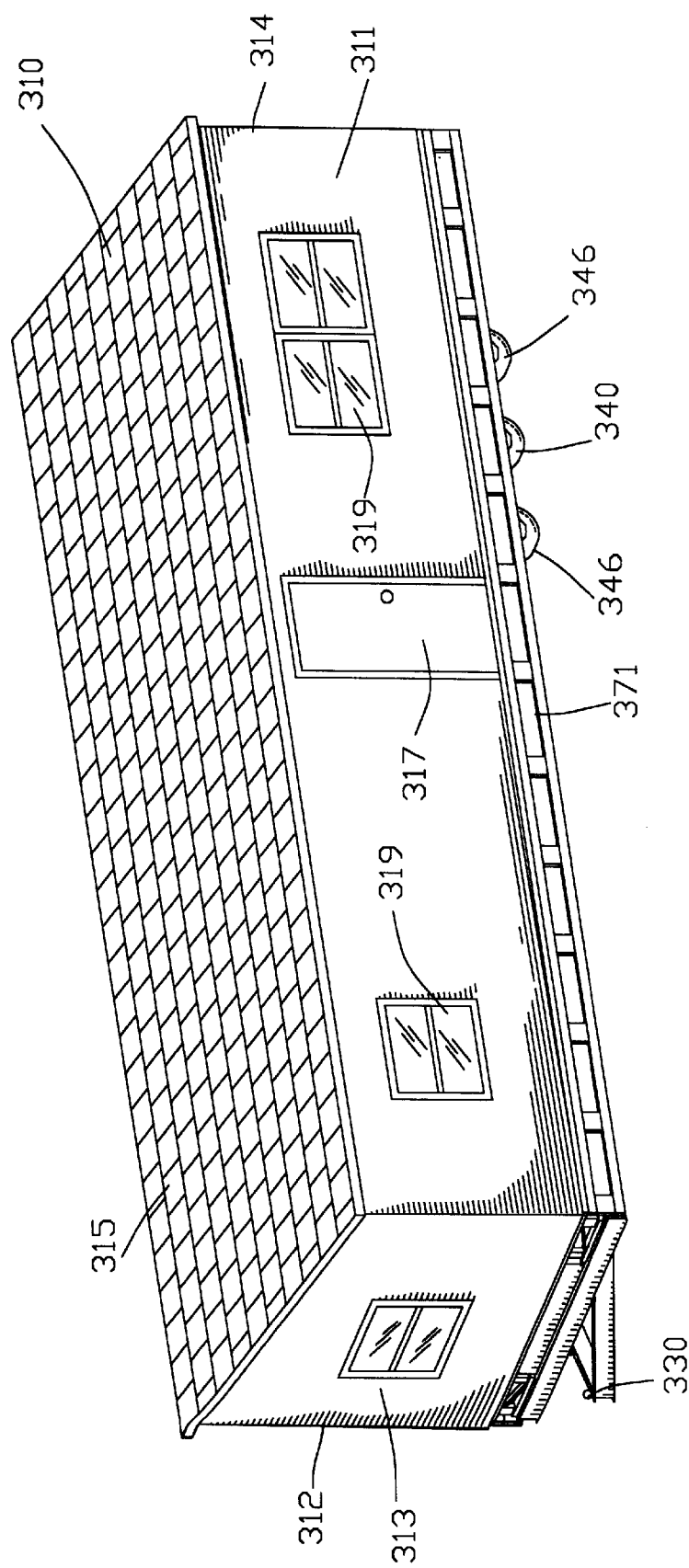
FIG. 14 is an isometric view of a second embodiment of the manufactured home incorporating the present invention.
Figure 15:
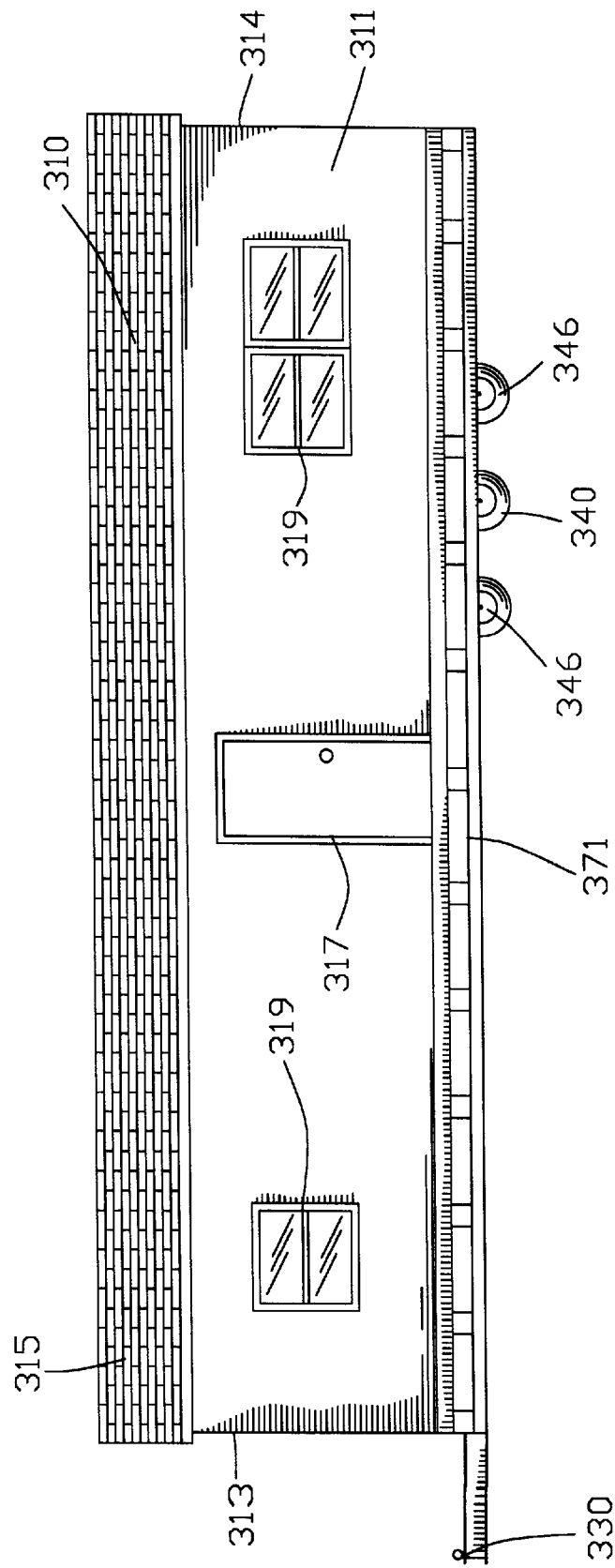
FIG. 15 is a side elevational view of FIG. 14.

FIGS. 14–16 are isometric, side and end views of a second embodiment of a manufactured home 310. The manufactured home 310 comprises peripheral walls 311 and 312, end walls 313 and 314 and a roof 315. The manufactured home 310 is designed to be transported to a remote location and to be erected on a ground surface 16 at a building site 18. As best shown in FIG. 16, the manufactured home 10 is shown disposed on a longitudinally extending beam 320 shown as frame elements 321 and 322. Preferably, the frame elements 321 and 322 are steel I-beams separated by a plurality of struts 324.

A removable hitch 330 and a plurality of removable wheel assemblies 340 enable the manufactured home 310 to be towed to the building site 18. Each of the plurality of wheel assemblies 340 has plural wheels 346 journalled on an axle 347. The plurality of wheel assemblies 340 are secured to the frame elements 321 and 322 by springs 348. Upon reaching the building site 18, the removable hitch 330 and the plurality of removable wheel assemblies 340 are removed and the manufactured home 310 is permanently mounted at the building site 18.

FIG. 17 is an end view similar to FIG. 16 after the manufactured home 310 has been lifted and placed upon a foundation 350 comprising foundation pilings 351 and 352 on the ground surface 18. The manufactured home 310 is secured to the foundation pilings 351 and 352 by conventional means which should be well known to those skilled in the art. The foundation pilings 351 and 352 extend upwardly from the ground surface 16 to space the manufactured home 310 from the ground surface 16 as described heretofore.

Figure 18:
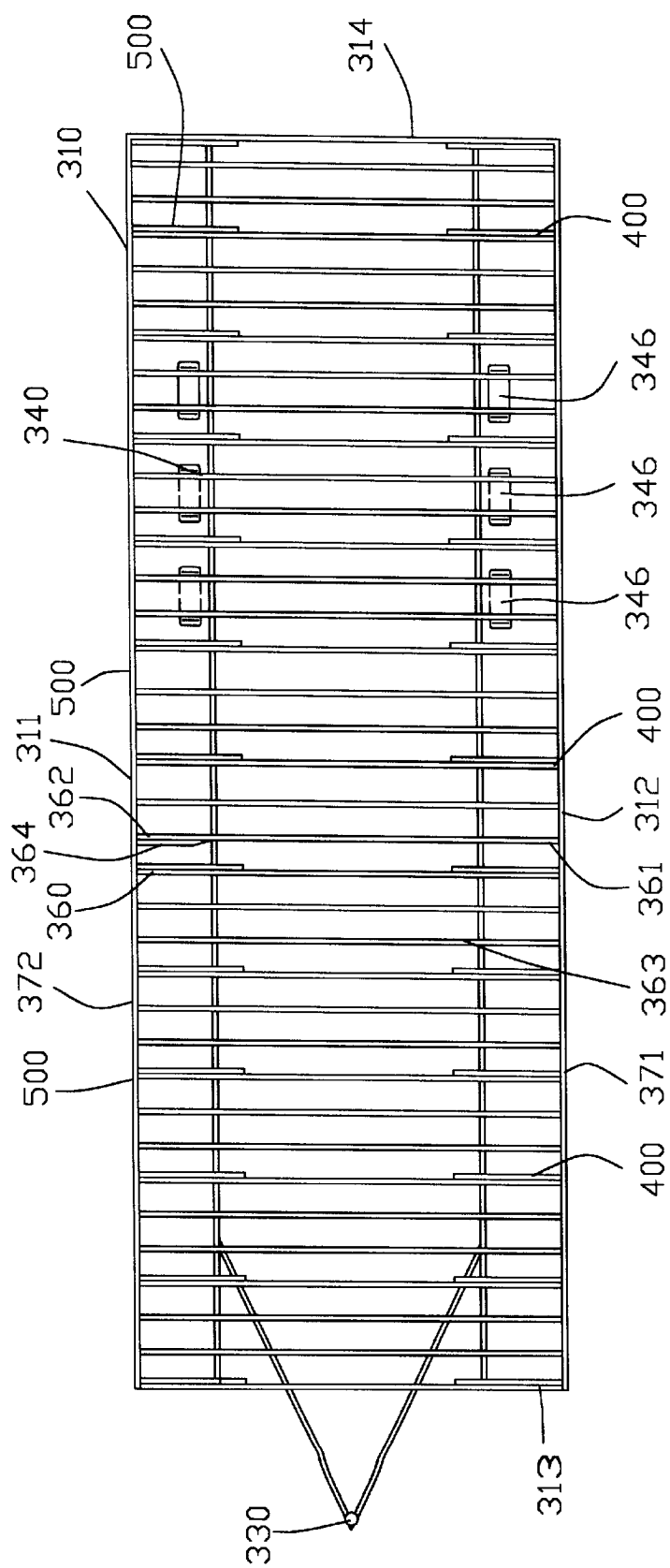
FIG. 18 is a top view of a floor frame of the manufactured home of FIGS. 14–17 incorporating the improved modular support assembly of the present invention.

FIG. 18 is a top view of a floor frame of the manufactured home 310 of FIGS. 14–17. The manufactured home 310 is supported by the first and second I-beams 321 and 322. The hitch 330 is removably secured to the first and second I-beams 321 and 322. In a similar manner, the plurality of wheel assemblies 340 are removably secured to the first and second I-beams 321 and 322. Upon reaching the building site 18, the hitch 330 and the plurality of wheel assemblies 340 are removed from the first and second I-beams 321 and 322 and the manufactured home 310 is permanently mounted at the building site 18.

Figure 19:
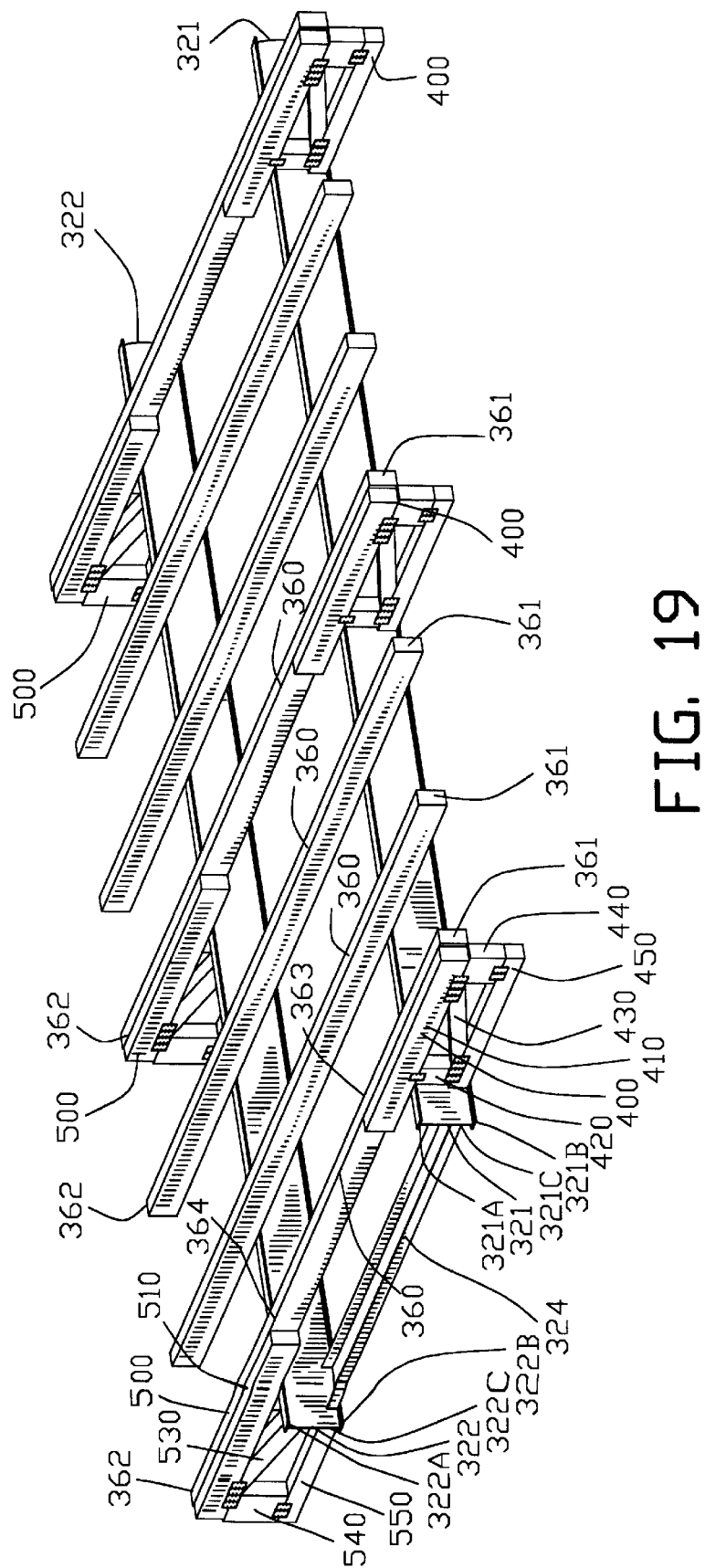
FIG. 19 is an enlarged isometric view of a portion of FIG. 18.

FIG. 19 is an enlarged isometric view of a portion of FIG. 18. The first I-beam 321 comprises an upper horizontal element 321A, a lower horizontal element 321B and an interconnecting vertical element 321C. In a similar manner, the second I-beam 322 comprises an upper horizontal element 322A, a lower horizontal element 322B and an interconnecting vertical element 322C.

The manufactured home 310 comprises a multiplicity of transverse beams 360 arranged in a substantially parallel relationship. Each of the multiplicity of transverse beams 360 comprises a first and a second end 361 and 362 and a first and a second intermediate portion 363 and 364. The first and second ends 361 and 362 extend outwardly to overhang the first and second longitudinally extending beams 321 and 322. The multiplicity of transverse beams 360 support the floor of the manufactured home 10 in a conventional manner. Typically, each of the multiplicity of transverse beams 360 is made of a wood material.

As best shown in FIGS. 14–17, a first and a second peripheral beam 371 and 372 are respectively connected to the first and second ends 361 and 362 of each of the multiplicity of transverse beams 360. In this example of the invention, the manufactured home 310 is supported by the first and second peripheral beams 371 and 372 resting upon the foundation pilings 351 and 352. However, it should be appreciated that the manufactured home 310 may be supported by the first and second I-beams 321 and 322 in a manner similar to FIG. 4.

As best seen in FIGS. 16 and 17, the first and second peripheral beams 371 and 372 are connected to the first and second ends 361 and 362 of the plurality of transverse beams 360 to support the walls 311 and 312 and to support the roof 315 with any load deposited on the roof 315. The plurality of transverse beams 360 support the first and second I-beams 321 and 322. Accordingly, the intermediate portions 363 and 364 of the multiplicity of transverse beams 360 may be deflected downward by the weight of the first and second I-beams 321 and 322 added to the normal floor load of the manufactured home 310. The downward deflection of the intermediate portions 363 and 364 of the multiplicity of transverse beams 360 will change the plumb or level of the floor of the manufactured home 310.

As best seen in FIG. 19, the second embodiment of the improved modular support of the present invention comprises a first and a second truss portion 400 and 500 for reinforcing intermediate portions 363 and 364 of the plurality of transverse beam 360.

The first truss portion 400 comprises a first upper member 410 having a first and a second end 411 and 412. The first upper member 410 of the first truss portion 400 is positioned to be supported by the upper horizontal beam element 321A of the first longitudinally extending beam 321. Preferably, the first upper member 410 of the first truss portion 400 is positioned to extend in a substantially horizontal direction.

The first truss portion 400 comprises a first inner depending member 420 having a first and a second end 421 and 422. The first end 421 of the first inner depending member 420 is connected to the first upper member 410 in proximity to the second end 412 thereof. The first inner depending member 420 extends downwardly from the first upper member 410 and preferably extend downwardly in a substantially vertical direction. In a manner similar to the first embodiment of the invention, the first truss portion 400 comprises a first brace 430 having a first and a second end 431 and 432.

In this second embodiment of the invention, the first truss portion 400 comprises a first outer depending member 440 and a first lower member 450. The first outer depending member 440 has a first and a second end 441 and 442 with the first end 421 of the first outer depending member 442 being connected to the first upper member 410 in proximity to the first end 411 thereof. The first outer depending member 440 extends downwardly from the first upper member 410 preferably in a substantially vertical direction.

The first lower member 450 has a first and a second end 451 and 452 with the first end 451 of the first lower member 450 being connected to the second end 442 of the first outer depending member 440. The second end 452 of the first lower member 450 is connected to the second end 422 of the first inner depending member 420. Preferably, the first lower member 450 of the first truss portion 400 is positioned to extend in a substantially horizontal direction.

The first end 431 of the first brace 430 is connected in proximity to the interconnection of the first end 411 of the first upper member 410 with the first end 441 of the first outer depending member 440. The second end 432 of the first brace 430 is connected in proximity to the interconnection of the second end 452 of the first lower member 450 and the second end 422 of the first inner depending member 420. Preferably, the first end 431 of the first brace 430 is connected to the first end 411 of the first upper member 410 and is simultaneously connected to the first end 441 of the first outer depending member 440. Simnilarly, the second end 432 of the first brace 430 is connected to second end 452 of the first lower member 450 and is simultaneously connected to the second end 422 of the first inner depending member 420. The first brace 430 of the first truss portion 400 extends angularly relative to the first upper member 410 and the first lower member 450.

Preferably, the first truss portion 400 is made from a wood material with the first upper and lower members 410 and 450, the first inner and outer depending member 420 and 440 and the first brace 430 of the first truss portion 400 being interconnected by a plurality of mechanical fasteners 405.

The second truss portion 500 comprises a second upper member 510 having a first and a second end 511 and 512. The second upper member 510 of the second truss portion 500 is positioned to be supported by the upper horizontal beam element 322A of the second longitudinally extending beam 322. Preferably, the second upper member 510 of the second truss portion 500 is positioned to extend in a substantially horizontal direction. In one example of the invention, the second truss portion 500 is a mirror image of the first truss portion 400.

The second truss portion 500 comprises a second inner depending member 520 having a first and a second end 521 and 522. The first end 521 of the second inner depending member 520 is connected to the second upper member 510 in proximity to the second end 512 thereof. The second inner depending member 520 extends downwardly from the second upper member 510 preferably in a substantially vertical direction. The second truss portion 500 comprises a second brace 530 having a first and a second end 531 and 532.

The second truss portion 500 comprises a second outer depending member 540 and a second lower member 550. The second outer depending member 540 has a first and a second end 541 and 542 with the first end 521 of the second outer depending member 542 being connected to the second upper member 510 in proximity to the first end 511 thereof. The second outer depending member 540 extends downwardly from the second upper member 510 preferably, in a substantially vertical direction.

The second lower member 550 has a first and a second end 551 and 552 with the first end 551 of the second lower member 550 being connected to the second end 542 of the second outer depending member 540. The second end 552 of the first lower member 550 is connected to the second end 522 of the second inner depending member 420. Preferably, the second lower member 550 of the second truss portion 500 is positioned to extend in a substantially horizontal direction.

The first end 531 of the second brace 530 is connected in proximity to the interconnection of the first end 511 of the second upper member 510 with the first end 541 of the second outer depending member 540. The second end 532 of the second brace 530 is connected in proximity to the interconnection of the second end 552 of the second lower member 550 and the second end 522 of the second inner depending member 520. Preferably, the first end 531 of the second brace 530 is connected to the first end 511 of the second upper member 510 and is simultaneously connected to the first end 541 of the second outer depending member 540. Similarly, the second end 532 of the second brace 530 is connected to second end 552 of the second lower member 550 and is simultaneously connected to the second end 522 of the second inner depending member 520. The second brace 530 of the second truss portion 500 extends angularly relative to the second upper member 510 and the second lower member 550.

Preferably, the second truss portion 500 is made from a wood material with the second upper and lower members 510 and 550, the second inner and outer depending member 520 and 540 and the second brace 530 of the second truss portion 500 being interconnected by a plurality of mechanical fasteners 505.

FIG. 20 is an enlarged end view of FIG. 19 illustrating a transverse beam 360 disposed on the first and second longitudinally extending beams 321 and 322 with FIG. 20A being a right side view of FIG. 20. The first and second ends 361 and 362 of the transverse beam 360 overhangs the first and second longitudinally extending beams 321 and 322. For purposes of illustration, the first peripheral beam 371 is absent from the first end 361 of the transverse beams 360 whereas the second peripheral beam 372 is shown connected to the second end 362 of the transverse beams 360.

Since the intermediate portions 363 and 364 of the transverse beams 360 support the first and second I-beams 321 and 322, a downward deflection may be encountered at the intermediate portions 363 and 364 of the transverse beams 360 as shown by the arrows.

FIG. 21 is a view similar to FIG. 20 illustrating the positioning of the first and second truss portions 400 and 500 relative to the first and second ends 361 and 362 of the transverse beam 360. FIG. 21A is a right side view of FIG. 21. The first and second truss portions 400 and 500 may be affixed to selected ones of the multiplicity of transverse beams 360 irrespective of whether the first and second peripheral beams 371 and 372 are absent from or affixed to the first and second ends 361 and 362 of the transverse beams 360.

FIG. 22 is a view similar to FIG. 21 illustrating the securing of the first and second truss portions 400 and 500 to the first and second ends 361 and 362 of the transverse beam 360. FIG. 22A is a right side view of FIG. 22. The first and second truss portions 400 and 500 reinforce the intermediates portions 363 and 364 of the transverse beam 360 to inhibit the downward deflection of the intermediates portions 363 and 364 of the transverse beams 360 as shown by the arrows in FIG. 20.

A significant advantage of the present invention is the ability to customize a manufactured home 310. As shown in FIG. 18, the first and second truss portions 400 and 500 are spaced within the multiplicity of transverse beams 360. In the example shown in FIG. 18, the multiplicity of transverse beams 360 are spaced on 16 inch centers. The first and second truss portions 400 and 500 are spaced on 48 inch centers.

The present invention enables a manufacturer to space the first and second truss portions 400 and 500 in a spacing to correspond to a desired load of the manufactured home 310. Since the first and second truss portions 400 and 500 may be affixed to the transverse beams 360 irrespective of whether the first and second peripheral beams 371 and 372 are absent or affixed to the first and second ends 361 and 362 of the transverse beam 360, the first and second truss portions 400 and 500 may be installed just prior to the installation of the floor upon the multiplicity of transverse beams 360.

The use of the first and second truss portions 400 and 500 enable a manufacturer of a manufactured home 310 to quickly and easily modify a manufactured home 310 during the construction process to comply with the building requirements of different regions of the country. Furthermore, the manufactured home 310 may be supported by the first and second peripheral beams 371 and 372 resting upon the foundation pilings 351 and 352 as shown in FIG. 17 or may be supported by the first and second I-beams 321 and 322 in a manner similar to FIG. 4.

FIG. 23 is a magnified view of a portion of FIG. 22 with FIG. 24 being right side view of FIG. 23. FIGS. 25 and 26 are top and bottom views of FIG. 23. The transverse beam 360 is disposed upon the upper horizontal beam element 321A of the first longitudinally extending beam 321 of a manufactured home 310 with the first end 361 overhanging the first longitudinally extending beam 321.

The first truss portion 400 is positioned on the first longitudinally extending beam 321 of a manufactured home 310 with the first upper member 410 being positioned to be supported by the upper horizontal beam element 321A of the first longitudinally extending beam 321 adjacent to the transverse beam 360. The first upper member 410 overhangs the first longitudinally extending beams 321 in a parallel relationship to the transverse beam 360. The first depending member 420 engages with a side surface of the upper horizontal beam element 321A of the first longitudinally extending beam 321.

The first truss portion 400 is connected to the first end 361 of the transverse beam 360 by an upper bracket 460 having a first and a second end 461 and 462. The first end 461 of the upper bracket 460 includes an aperture 464 for receiving a mechanical fastener 466 such as a screw. The mechanical fastener 466 secures the first end 461 of the upper bracket 460 to the first upper member 410 of the first truss portion 400 with the second end 462 of the upper bracket 460 engaging with the upper horizontal beam element 321A of the first longitudinally extending beam 321. The first longitudinally extending beam 321 is contained on one side by the depending member 420 and is contained on the other side by the upper bracket 460. An optional lower bracket 470 may be secured between the first lower member 450 and the lower horizontal beam element 321B of the first longitudinally extending beam 321 in a similar manner. The lower bracket 470 has a first and a second end 471 and 472. The first end 471 of the lower bracket 470 includes an aperture 474 for receiving a mechanical fastener 476 such as a screw. The mechanical fastener 476 secures the first end 471 of the lower bracket 470 to the first lower member 450 of the first truss portion 400 with the second end 472 of the lower bracket 470 engaging with the lower horizontal beam element 321B of the first longitudinally extending beam 321. The brackets 460 and 470 maintain the first longitudinally extending beam 321 in alignment and inhibit the first longitudinally extending beam 321 from twisting.

The first truss portion 400 is secured to the first end 361 of transverse beam 360 by suitable means such as an adhesive 480, mechanical fasteners such as nails or staples 482 or a combination of both. The first truss portion 400 may be secured to the first end 361 of transverse beam 360 by an adhesive 480 with staples 482 holding the first truss portion 400 against the first end 361 of transverse beam 360 during the curing of the adhesive 480.

FIG. 23A is a further magnified view of a portion of FIG. 23. When the first truss portion 400 is positioned on the first longitudinally extending beam 321 and is secured to the first end 361 of transverse beam 360, the second end 452 of the lower member 450 coacts with the first longitudinally extending beam 321 and with the first brace 430 for providing a bracing between the first upper member 410 and the first longitudinally extending beam 321 for supporting the intermediate portion 363 of the transverse beam 360. Preferably, the second end 452 of the lower member 450 extends beyond the inner depending member 420 to create a projection 454 for engaging with the interconnecting vertical beam element 321C of the longitudinally extending beam 321. The projection 454 enables the depending member 420 to engage with the upper horizontal beam element 321A simultaneously with the projection 454 engaging with the interconnecting vertical beam element 321C when the depending member 420 is substantially parallel to the interconnecting vertical beam element 321C of the first longitudinally extending beam 321. The projection 454 may include a diagonal cut 456 for creating a perpendicular corner 458. The perpendicular corner 458 enables the diagonal cut 456 to engage with the lower horizontal beam element 322B of the first longitudinally extending beam 321 when the projection 454 engages with the interconnecting vertical beam element 321C. Accordingly, both the interconnecting vertical beam element 321C as well as the lower horizontal beam element 322B of the first longitudinally extending beam 321 support the second end 452 of the lower member 450.

The projection 454, the diagonal cut 456 and the perpendicular corner 458 facilitate the installation of the first truss portion 400 as well as enabling the first truss portion 400 to be affixed to the transverse beams 360 irrespective of whether the first peripheral beam 371 is present or absent from the first end 361 of the transverse beams 360. Furthermore, the projection 454, the diagonal cut 456 and the perpendicular corner 458 eliminates the need for any shim blocks or bushings between the first truss portion 400 and the first longitudinally extending beam 321.

Figure 27:
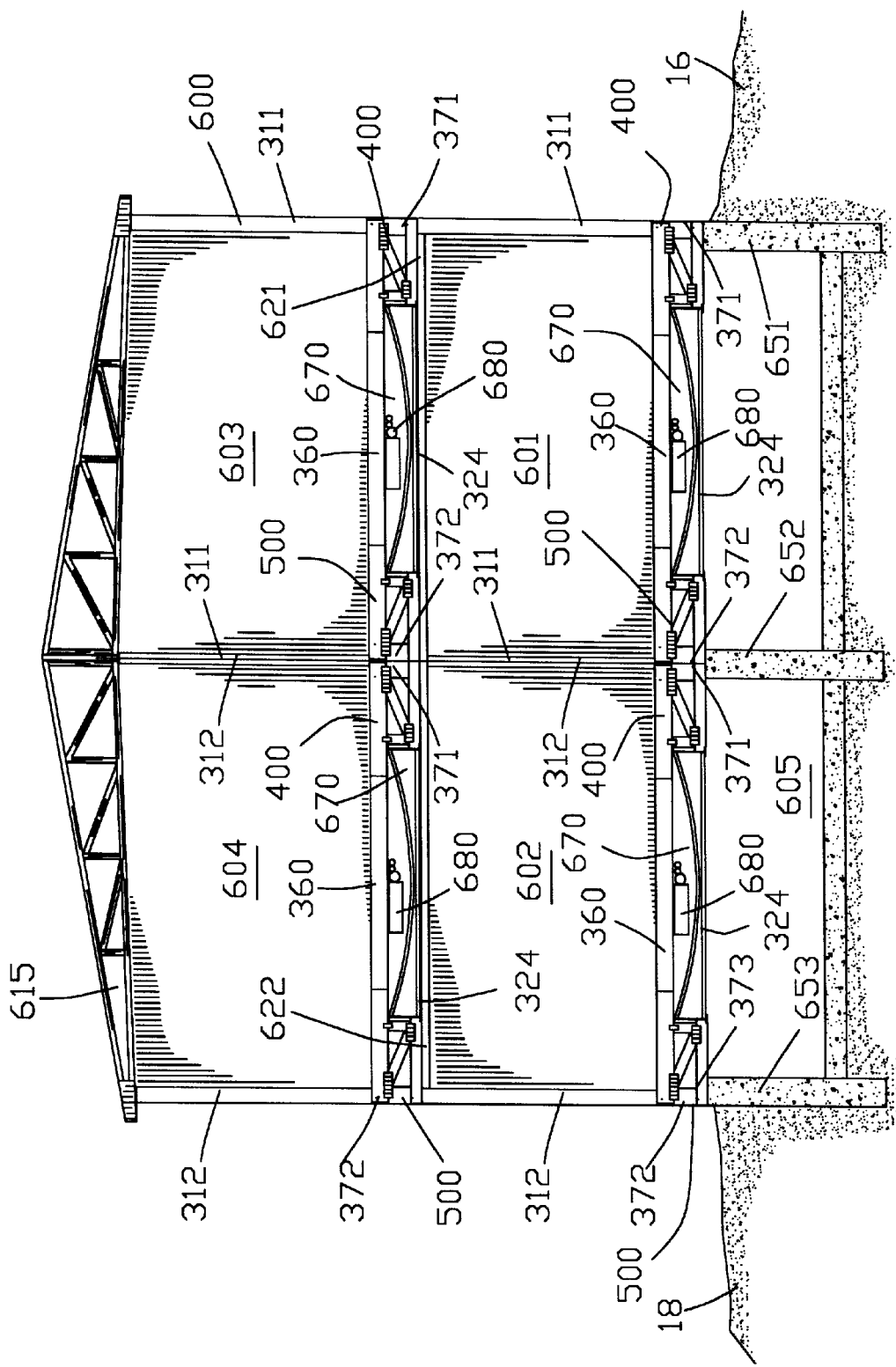
FIG. 27 is an end view of multiple components of a manufactured home incorporating the present invention and disposed upon a foundation and after removal of the removable transport wheel assembly.

FIG. 27 is an end view of a multiple story manufactured home 600 built in accordance with the present invention. The multiple story manufactured home 600 comprises four units 601–604 with units 601 and 602 comprising the first floor and with units 603 and 604 comprising the second floor. First floor unit 601 is a mirror of first floor unit 602 whereas second floor unit 603 is a mirror of the second floor unit 604.

The first floor units 601 and 602 may include roof beams 621 and 622 extending between the first and second sidewalls 311 and 312 for establishing and maintaining the position of the upper portions of the sidewalls 311 and 312 of each of the first floor units 601 and 602. Each of the first floor units 601 and 602 include a multiplicity of transverse beams 360 and a first and a second peripheral beam 371 and 372 as heretofore described.

In this embodiment, the foundation is shown as foundation walls 651–653 disposed about a basement. The center foundation wall 652 may be a foundation wall as shown or may be a beam extending across the span of the basement 605 as should be well known to those skilled in the art.

The first floor units 601 and 602 are positioned on the foundation walls 651–653 and are shown with the first floor units 601 and 602 being joined by conventional means as should be well known to those skilled in the art.

Each of the second floor units 603 and 604 comprise of the multiplicity of transverse beams 360 and peripheral beams 371 and 372. The second floor units 603 and 604 are positioned such that the peripheral beams 371 and 372 of the upper unit 603 are positioned directly upon the sidewalls 311 and 312 of the first floor unit 601. In a similar manner, the peripheral beams 371 and 372 of the second floor unit 604 are positioned directly above the sidewalls 311 and 312 of the first floor unit 602. Accordingly, the second floor units 603 and 604 are supported by the foundation 651–653 through the compression of sidewalls 311 and 312 of the first floor units 601 and 602.

Voids 670 are defined between the multiplicity of transverse beams 360 and the plurality of struts 324 of each of the units 601–604 for accommodating and receiving pipes, electrical conduits, air ducts 680 or the like. The pipes, electrical conduits, air ducts 680 are suspended by the multiplicity of transverse beams 360. The first and second truss portion 400 and 500 inhibit the downward deflection of the multiplicity of transverse beams 360 by the weight of the first and second I-beams 321 and 322 as well as the weight of the pipes, electrical conduits, air ducts 680 added to the normal floor load of the manufactured home 310.

FIG. 28 is a magnified view of a portion of FIG. 4 illustrating the vector forces applied to the first embodiment of the first truss portion 100. The manufactured home 10 of FIG. 28 is supported by the I-beam 21 resting upon the foundation pilings 5 1. The force of the wall and roof is applied from the wall 11 to the first end 61 of the transverse bean 60. The force of the first end 61 of the transverse bean 60 is applied through the first brace 130 to the foundation pilings 51. The first brace 130 supports the first end 111 of the first upper member 100 from the foundation pilings 51 through a compressive force applied to the brace 130. The compressive force applied to the first brace 130 is shown by the facing arrows. The force of the floor is applied is applied through the first depending member 120 to the foundation pilings 51.

FIG. 29 is a magnified view of a portion of FIG. 17 illustrating the vector forces applied to the second embodiment of the first truss portion 400. The manufactured home 310 of FIG. 29 is supported by the first peripheral beam 371 resting upon the foundation piling 351. However, it should be appreciated that the manufactured home 310 may be supported by the first I-beam 321 resting upon the foundation pilings 351 in a manner similar to FIG. 28.

The force of the wall and roof is applied from the wall 11 through the outer depending member 440 and the peripheral beam 371 (not shown) to the foundation pilings 351. The force of the first I-beam 321 is applied through the first brace 430 to the outer depending member 440 and the upper member 410. The first brace 430 supports the first I-beam 321 through a tension force applied to the brace 430. The tension force applied to the first brace 430 is shown by the opposite facing arrows.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved modular support assembly cooperatively associated with a transverse beam disposed upon a longitudinally extending metallic I-beam of a building structure thereby defining a cantilevered end of the transverse beam, the longitudinally extending metallic I-beam having an upper horizontal element and a lower horizontal element with an interconnecting vertical element, the improved modular support assembly comprising;

a truss portion comprising an upper member, a depending member and a brace;

said upper member extending between a first and a second end;

said depending member extending between a first and a second end;

said brace extending between a first and a second end;

said depending member being connected to extend downwardly from said upper member with said brace angularly interconnecting said upper member and said depending member;

said first end of said depending member being connected to said upper member displaced from said first end of said upper member;

said first end of said brace being connected to said upper member in proximity to said first end of said upper member;

said second end of said depending member being connected to said brace in proximity to said second end of said brace;

said truss portion having a projection located below said depending member;

said projection extending beyond said second end of said depending member in a direction parallel to a direction defined from said first end to said second end of said upper member;

said projection being unitary with said brace;

said truss portion being positioned adjacent to the cantilevered end of the transverse beam with said upper member of said truss portion being supported by the upper horizontal beam elements of the longitudinally extending metallic I-beam;

said upper member of said truss portions being in parallel alignment and in contact with the cantilevered end of the transverse beam and with said projection of said truss portion simultaneously and directly engaging said lower horizontal element and directly engaging said interconnecting vertical element of said longitudinally extending metallic I-beam enabling said brace to coact with the longitudinally extending I-beam of the building structure; and a plurality of fasteners securing said upper member of said truss portion to the cantilevered end of the transverse beam enabling said brace coacting between the longitudinally extending metallic I-beam and said upper member of said truss to reinforce the cantilevered end of the transverse beam thereby.

2. An improved modular support assembly cooperatively associated with a first and a second end of a transverse beam, the transverse beam being disposed upon a first and a second longitudinally extending metallic I-beam of a manufactured home with the first and second ends overhanging the first and second longitudinally extending metallic I-beams, each of the first and second longitudinally extending metallic I-beams having an upper horizontal element and a lower horizontal element with an interconnecting vertical element, the improved modular support assembly comprising:

a first truss portion comprising a first upper member, a first depending member and a first brace;

said first upper member extending between a first and a second end;

said first depending member extending between a first and a second end;

said first brace extending between a first and a second end;

a second truss portion comprising a second upper member, a second depending member and a second brace;

said second upper member extending between a first and a second end;

said second depending member extending between a first and a second end;

said second brace extending between a first and a second end;

said first and second depending members connected to extend downwardly from said first and second upper members, respectively;

said first and second braces respectively interconnecting said first and second upper members and said first and second depending members;

said first end of said first depending member being connected to said first upper member displaced from said first end of said first upper member;

said first end of said first brace being connected to said first upper member in proximity to said first end of said first upper member;

said second end of said first depending member being connected to said first brace in proximity to said second end of said first brace;

said first brace having a first projection located below said first depending member;

said first projection extending beyond said second end of said first depending member in a direction parallel to a direction defined from said first end to said second end of said first upper member;

said first projection being unitary with said first brace;

said first end of said second depending member being connected to said second upper member displaced from said first end of said second upper member;

said first end of said second brace being connected to said second upper member in proximity to said first end of said second upper member;

said second end of said second depending member being connected to said second brace in proximity to said second end of said second brace;

said second brace having a second projection located below said second depending member;

said second projection extending beyond said second end of said second depending member in a direction parallel to a direction defined from said first end to said second end of said second upper member;

said second projection being unitary with said second brace;

said first and second truss portions being positioned adjacent to the first and second ends of the transverse beam with said first and second upper members of said first and second truss portions being supported by the upper horizontal beam elements of the first and second longitudinally extending metallic I-beams;

said first and second upper members of said first and second truss portions being in parallel alignment and in contact with the first and second overhanging ends of the transverse beam and with said first and second projections of said first and second truss portions simultaneously and directly engaging said lower horizontal element and directly engaging said interconnecting vertical element of said first and second longitudinally extending metallic I-beams enabling said first and second braces respectively to coact with the first and second longitudinally extending I-beams providing bracings between said first and second upper members and the first and second longitudinally extending I-beams; and a first and a second plurality of fasteners securing respectively, said first and second upper members of said first and second truss portions to the first and second overhanging ends of the transverse beam enabling said first and second braces to respectively coact between the first and second longitudinally extending I-beams and said first and second upper members of said first and second truss portions to support the first and second ends of the transverse beam thereby.

3. An improved modular support assembly cooperatively associated with a first and a second end of a transverse beam, the transverse beam being disposed upon a first and a second longitudinally extending metallic I-beam of a manufactured home, the first and second longitudinally extending metallic I-beams being disposed in a substantially parallel orientation, each of the first and second longitudinally extending metallic I-beams having an upper horizontal element and a lower horizontal element with an interconnecting vertical element, the improved modular support assembly comprising;

a first truss portion comprising a first upper horizontal member, a first depending member and a first brace;

said first upper horizontal member extending between a first end and a second end;

said depending member extending between an upper end and a lower end with said upper end being secured to said first upper horizontal member and extending downwardly therefrom;

said first brace having a first end and a second end with said first end of said brace being secured proximate to said first end of said upper horizontal member and with said second end of said brace being secured proximate to said second end of said depending member;

said second end of said first brace extending beyond said second end of said first depending member defining a first projection;

said first projection being unitary with said first brace;

a second truss portion comprising a second upper horizontal member, a second depending member and a second brace;

said second upper horizontal member extending between a first end and a second end;

said depending member extending between an upper end and a lower end with said upper end being secured to said second upper horizontal member and extending downwardly therefrom;

said second brace having a first end and a second end with said first end of said brace being secured proximate to said first end of said upper horizontal member and with said second end of said brace being secured proximate to said second end of said depending member;

said second end of said second brace extending beyond said second end of said second depending member defining a second projection;

said second projection being unitary with said second brace;

said first and second truss portions being positioned adjacent to the first and second ends of the transverse beam with said first and second upper members of said first and second truss portions being supported by the upper horizontal beam elements of the first and second longitudinally extending metallic I-beams;

said first and second upper members of said first and second truss portions being in parallel alignment and in contact with the first and second ends of the transverse beam and with said first and second projections of said first and second truss portions simultaneously and directly engaging the lower horizontal element and directly enaging the interconnectiig vertical element of the first and second longitudinally extending metallic I-beams enabling said first and second braces to respectively coact with the first and second longitudinally extending I-beams providing bracings between said first and second upper members and the first and second longitudinally extending I-beams; and a first and second plurality of fasteners securing respectively, said first and second upper members of said first and second truss portions to the first and second ends of the transverse beam with said first and second braces respectively coacting with the lower horizontal elements and the vertical elements of the first and second longitudinally extending beams providing bracings between said first and second upper horizontal members and the first and second longitudinally extending beams reinforcing the first and second ends of the transverse beam thereby.

4. An improved modular support assembly cooperatively associated with a first and a second end of a transverse beam, the transverse beam being disposed upon a first and a second longitudinally extending metallic I-beam of a manufactured home, the first and second longitudinally extending metallic I-beams being disposed in a substantially parallel orientation, each of the first and second longitudinally extending metallic I-beams having an upper horizontal element and a lower horizontal element with an interconnecting vertical element, the improved modular support assembly comprising;

a first truss portion comprising a first upper and lower horizontal member, a first inner and outer depending member and a first brace;

each of said first upper and lower horizontal members extending between a first end and a second end;

each of said first inner and outer depending members extending between an upper end and a lower end with said upper ends being secured to said first upper horizontal member and extending downwardly therefrom and with said lower ends being secured to said first lower horizontal member;

said first brace having a first end and a second end with said first end of said first brace being secured relative to said first end of said first upper horizontal member and said first outer depending member and with said second end of said first brace being secured relative to said second end of said first lower horizontal member and said first inner depending member;

said second end of said first lower member brace extending beyond said second end of said first inner depending member defining a first projection;

said first projection being unitary with said first lower member;

a second truss portion comprising a second upper and lower horizontal member, a second inner and outer depending member and a second brace;

each of said second upper and lower horizontal members extending between a first end and a second end;

each of said second inner and outer depending members extending between an upper end and a lower end with said upper ends being secured to said second upper horizontal member and extending downwardly therefrom and with said lower ends being secured to said second lower horizontal member;

said second brace having a first end and a second end with said first end of said second brace being secured relative to said first end of said second upper horizontal member and said second outer depending member and with said second end of said second brace being secured relative to said second end of said second lower horizontal member and said second inner depending member;

said second end of said second lower member brace extending beyond said second end of said second inner depending member defining a second projection;

said second projection being unitary with said second lower member;

said first and second truss portions being positioned adjacent to the first and second ends of the transverse beam with said first and second upper members being in parallel alignment and in contact with the first and second ends of the transverse beam and with said first and second upper horizontal members resting on the upper horizontal elements of the first and second longitudinally extending beams;

said first and second projections of said first and second truss portions simultaneously and directly engaging the lower horizontal element and directly engaging the interconnecting vertical element of the first and second longitudinally extending metallic I-beams enabling said first and second braces to respectively coact with the first and second longitudinally extending I-beams providing bracings of said first and second upper members from the first and second longitudinally extending I-beams; and a first and second plurality of fasteners securing respectively, said first and second upper members of said first and second truss portions to the first and second ends of the transverse beam with said first and second braces and said first and second lower horizontal members respectively coacting with the first and second longitudinally extending I-beam providing bracings reinforcing the first and second ends of the transverse beam thereby.

* * * * *